US010838729B1

(12) United States Patent
Al-Otoom et al.

(10) Patent No.: US 10,838,729 B1
(45) Date of Patent: Nov. 17, 2020

(54) SYSTEM AND METHOD FOR PREDICTING MEMORY DEPENDENCE WHEN A SOURCE REGISTER OF A PUSH INSTRUCTION MATCHES THE DESTINATION REGISTER OF A POP INSTRUCTION

(71) Applicant: Apple Inc., Cupertino, CA (US)

(72) Inventors: Muawya M. Al-Otoom, Pleasanton, CA (US); Conrado Blasco, Sunnyvale, CA (US); Deepankar Duggal, Sunnyvale, CA (US); Kulin N. Kothari, Cupertino, CA (US); Richard F. Russo, San Jose, CA (US)

(73) Assignee: Apple Inc., Cupertino, CA (US)

( * ) Notice: Subject to any disclaimer, the term of this patent is extended or adjusted under 35 U.S.C. 154(b) by 21 days.

(21) Appl. No.: 15/927,501

(22) Filed: Mar. 21, 2018

(51) Int. Cl.
*G06F 9/312* (2018.01)
*G06F 9/38* (2018.01)
*G06F 9/30* (2018.01)

(52) U.S. Cl.
CPC .......... *G06F 9/384* (2013.01); *G06F 9/30043* (2013.01); *G06F 9/3838* (2013.01)

(58) Field of Classification Search
CPC ................................ G06F 9/3838; G06F 9/384
See application file for complete search history.

(56) References Cited

U.S. PATENT DOCUMENTS

| | | | | |
|---|---|---|---|---|
| 6,505,293 B1 * | 1/2003 | Jourdan | .............. | G06F 9/30181 712/217 |
| 6,625,723 B1 * | 9/2003 | Jourdan | ................ | G06F 9/3824 712/216 |
| 9,575,754 B2 | 2/2017 | Keller et al. | | |
| 9,996,348 B2 | 6/2018 | Williams, III et al. | | |
| 2013/0339671 A1 * | 12/2013 | Williams, III | ...... | G06F 9/30043 712/217 |
| 2014/0181482 A1 * | 6/2014 | Snnaus | ............... | G06F 9/30043 712/225 |
| 2014/0379986 A1 * | 12/2014 | Troester | .................... | G06F 9/38 711/132 |
| 2015/0067305 A1 * | 3/2015 | Olson | ................... | G06F 9/3836 712/225 |
| 2016/0026463 A1 | 1/2016 | Sundar | | |
| 2017/0185410 A1 * | 6/2017 | Abernathy | .............. | G06F 9/384 |

OTHER PUBLICATIONS

Perais et al. "Cost Effective Physical Register Sharing", 2016 IEEE International Symposium on High Performance Computer Architecture (HPCA), Mar. 2016, 13 pages.

* cited by examiner

*Primary Examiner* — David J. Huisman
(74) *Attorney, Agent, or Firm* — Kowert Hood Munyon Rankin and Goetzel PC; Rory D. Rankin

(57) ABSTRACT

A system and method for efficiently reducing the latency and power of memory access operations. A processor includes a stack pointer (SP) load-store dependence (LSD) predictor which predicts whether a memory dependence exists on a store instruction. The processor also includes a register file (RF) LSD predictor which predicts whether a memory dependence exists on a store instruction or a load instruction by a subsequent load instruction in program order. Each of the SP-LSD predictor and the RF-LSD predictor predicts and performs register renaming in a pipeline stage earlier than a renaming pipeline stage. The RF-LSD predictor also determines whether any intervening instructions between a producer memory instruction and a consumer memory instruction modify a predicted dependence.

17 Claims, 14 Drawing Sheets

SYSTEM AND METHOD FOR PREDICTING MEMORY DEPENDENCE WHEN A SOURCE REGISTER OF A PUSH INSTRUCTION MATCHES THE DESTINATION REGISTER OF A POP INSTRUCTION

BACKGROUND

Technical Field

Embodiments described herein relate to the field of computing systems and, more particularly, to efficiently reducing the latency and power of memory access operations.

Description of the Related Art

Generally speaking, a variety of computing systems include one or more processors and a memory, and the processors generate access requests for instructions and application data while processing one or more software applications. The one or more processors may include a central processing unit (CPU), data parallel processors like graphics processing units (GPUs), digital signal processors (DSPs), and so forth. The processors ideally produce useful execution of a maximum number of N instructions per thread for each stage of a pipeline during each clock cycle, wherein N is an integer greater than one. To increase the number N, microprocessors typically include overlapping pipeline stages, out-of-order execution of instructions, and support simultaneous multi-threading. These techniques take advantage of instruction level parallelism (ILP) in source code. However, at least data dependencies reduce maximum throughput of the microprocessor to below N instructions per cycle.

A data dependency occurs when an operand of an instruction depends on a result of an older instruction in program order. Data dependencies may appear either between operands of subsequent instructions in a straight line code segment or between operands of instructions belonging to subsequent loop iterations. In straight line code, read after write (RAW), write after read (WAR) or write after write (WAW) dependencies may be encountered. Register renaming is used to allow parallel execution of instructions despite the WAR and WAW dependencies. However, the true dependency, or RAW dependency, is still intact. Therefore, architectural registers repeatedly used as a destination register and subsequently as a source register cause serialization of instruction execution for associated source code segments.

One example of a common RAW dependency with an architectural register is a load instruction, or a read operation, attempting to read a memory location that has been modified by an older (in program order) store instruction that has not yet committed its results to the memory location. This type of RAW dependency may occur frequently during program execution. Reading the memory location may include an appreciable latency and reduce processor throughput.

In view of the above, efficient methods and mechanisms for efficiently reducing the latency of load operations are desired.

SUMMARY

Systems and methods for efficiently reducing the latency of load operations are contemplated. In various embodiments, a processor includes a stack pointer load-store dependence (SP-LSD) predictor that receives decoded instructions and predicts memory dependencies. The SP-LSD predictor predicts whether a memory dependence exists on a store instruction determined to be a stack push instruction. The memory dependence is between the stack push instruction and a subsequent load instruction in program order determined to be a stack pop instruction. In an embodiment, the SP-LSD predictor includes a table and control logic. The control logic receives a decoded store instruction and based at least upon determining the store instruction has an address architectural register identifier (ID) matching a value of the stack pointer, the control logic determines the store instruction is a push instruction and searches the table. In some embodiments, the control logic searches the table using at least the source architectural register ID of the store instruction. In an embodiment, if the search results in a miss, then an available table entry is allocated. If one embodiment, if the search results in a hit, then the hit table entry has one or more fields updated with information associated with the store instruction.

The control logic receives a decoded load instruction. In some embodiments, based at least upon determining the load instruction has an address architectural register identifier (ID) matching a value of the stack pointer, the control logic determines the load instruction is a stack pop instruction. In response to determining the load instruction is a stack pop instruction, the control logic searches the table. In an embodiment, the control logic uses at least the destination architectural register ID of the load instruction during the search of the table. If a hit occurs, then the control logic determines the load instruction (pop instruction) is predicted to be dependent on an earlier store instruction (push instruction).

In one embodiment, based on an indication that a memory dependence is predicted based on the hit in the table, the SP-LSD predictor performs register renaming for the subsequent load instruction (pop instruction) in program order by assigning at least one destination architectural register ID of the load instruction with a physical register ID already assigned to a source architectural register ID of the store instruction. In an embodiment, the table entry stores the physical register IDs. In one embodiment, after renaming, the control logic of the SP-LSD deallocates the table entry in the table. In various embodiments, the SP-LSD predictor is capable of allocating and deallocating table entries and providing physical register IDs for register renaming in a pipeline stage earlier than a renaming pipeline stage.

In various embodiments, the processor includes a register file (RF) load-store dependence (LSD) predictor that receives decoded instructions and predicts memory dependence. For store and load instructions that are not used as stack push and pop instructions, the RF-LSD predictor determines whether a memory dependence exists on a given store instruction by a subsequent load instruction in program order. Additionally, the RF-LSD predictor determines whether a memory dependence exists on a given load instruction by a subsequent load instruction in program order. Therefore, the RF-LSD predictor determines whether a memory dependence exists on two different types of producer instructions. The two types of producer instructions are store instructions and load instructions.

In some embodiments, the RF-LSD predictor also includes a table and control logic. Similar to the SP-LSD predictor, a program counter is not used when searching the table of the RF-LSD predictor. In an embodiment, control logic of the RF-LSD predictor searches the table using at least one or more of the address architectural register ID and the immediate value of the address operands. In one embodiment, based on the hit in the table, the RF-LSD predictor performs register renaming for the subsequent load instruction in program order, which is also the consumer memory instruction.

In various embodiments, the RF-LSD predictor is capable of predicting and providing physical register IDs for register renaming in a pipeline stage earlier than a renaming pipeline stage. In various embodiments, the control logic of the RF-LSD predictor determines whether any intervening instructions between a producer memory instruction and a consumer memory instruction modify the values stored in the register pointed to by the address register ID stored in the RF-LSD table. If so, the corresponding table entry is modified or deallocated based on the determined modification.

These and other embodiments will be further appreciated upon reference to the following description and drawings.

BRIEF DESCRIPTION OF THE DRAWINGS

The above and further advantages of the methods and mechanisms may be better understood by referring to the following description in conjunction with the accompanying drawings, in which.

Figure 1:
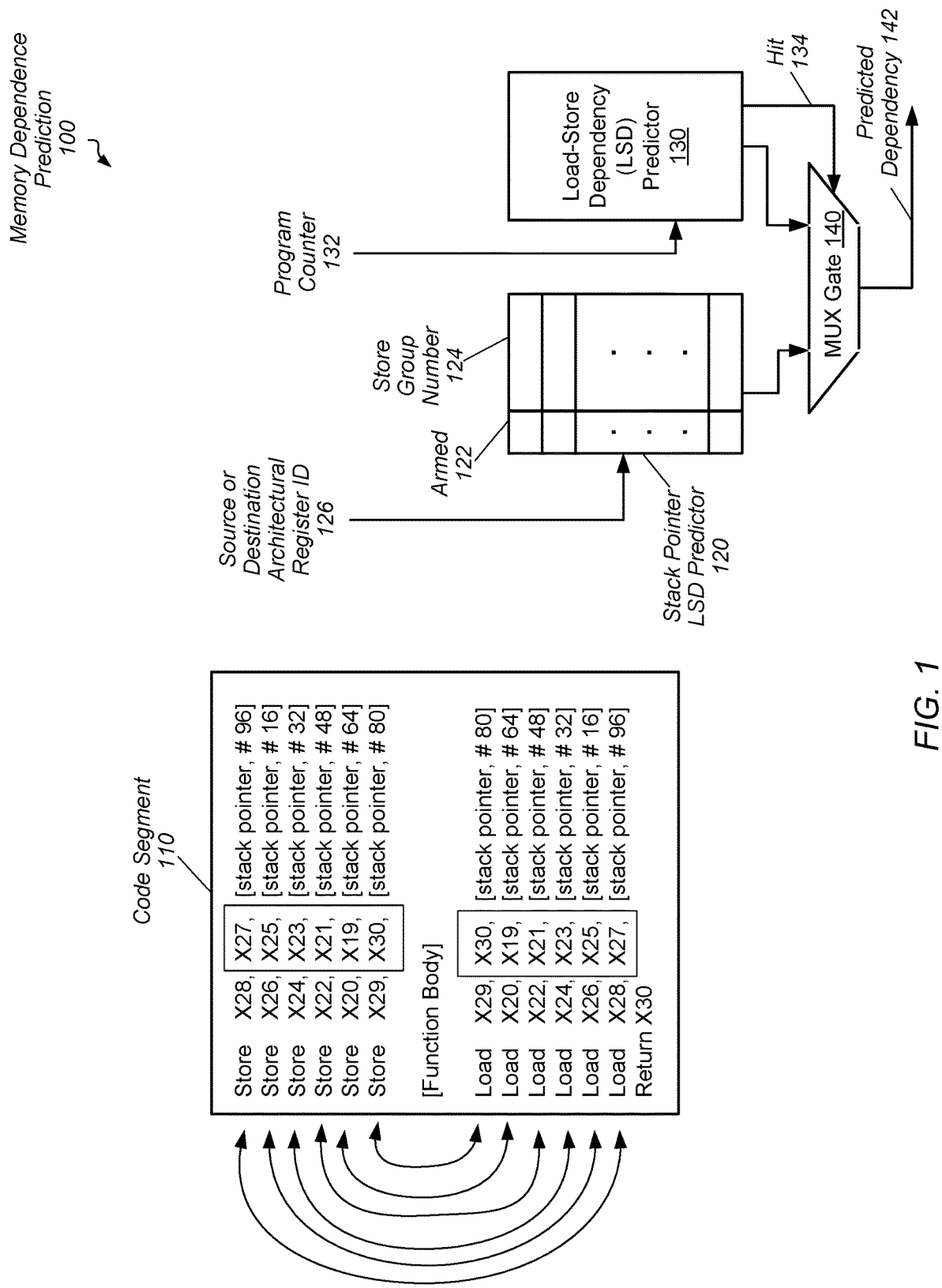
FIG. 1 is a block diagram of one embodiment of memory dependence prediction.

While the embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) for that unit/circuit/component.

DETAILED DESCRIPTION OF EMBODIMENTS

In the following description, numerous specific details are set forth to provide a thorough understanding of the embodiments described in this disclosure. However, one having ordinary skill in the art should recognize that the embodiments might be practiced without these specific details. In some instances, well-known circuits, structures, and techniques have not been shown in detail for ease of illustration and to avoid obscuring the description of the embodiments.

Turning to FIG. 1, a generalized block diagram illustrating one embodiment of memory dependence prediction 100 is shown. In the illustrated embodiment, code segment 110 includes multiple instructions in a computer program. In particular, multiple stack push operations implemented by store instructions are shown prior to a function call. Additionally, multiple stack pop operations implemented by load instructions are shown after the function call. The pairs of store and load instructions corresponding to one another are highlighted by the double arrow lines. The pairs are used to generate the sequence of pushes and pops for the stack. The return value, which is pushed onto the stack, is saved to a particular register and the return value will be restored to the same register from the same memory location.

In some embodiments, the instruction set architecture (ISA) includes a store pair instruction with a pair of source operands and sends a copy of two source operands stored in two registers identified by two source architectural register identifiers (IDs) to a memory location pointed to by an address calculated from the address operands. In an embodiment, the two source operands are two 32-bit words or two 64-bit double words.

Additionally, the ISA includes a load pair instruction with a pair of destination operands and receives two operands from a memory location pointed to by an address calculated from the address operands and stores the two operands in the two destination architectural registers identified by destination architectural register identifiers (IDs). Code segment 110 includes the use of store pair instructions and load pair instructions.

As can be seen, each of the instructions uses a stack pointer as an address architectural register as one of the address operands. The other address operand is an immediate value indicated by the "#" symbol. The first store pair instruction includes the architectural register ID X27 as the second source operand. This store pair instruction is paired with the last load pair instruction, which includes the architectural register ID X27 as the second destination operand. The other instructions are paired up using the same architectural register IDs for operands as shown.

Software applications with multiple function calls (library calls) use repeating similar code sequences such as the sequence shown in code segment 110. This type of code sequence causes a load-store dependency (LSD) predictor to mispredict and utilize training. For example, the LSD predictor 130, which is searched using a program counter (PC), will mispredict and need training for the sequence in code segment 110. In addition, the data propagation delay for a given architectural register begins with Define followed by Store followed by Load and ending with Use. It is desired to reduce the data propagation delay for a given architectural register to begin with Define and end with Use. In order to handle these issues, the stack pointer (SP) LSD predictor 120 is included in the processor. The SP-LSD predictor 120 is used to handle stack push operations and stack pop operations in a separate structure from the LSD predictor 130.

In the illustrated embodiment, the SP-LSD predictor 120 includes a table with each entry with an armed field 122 and a store group number field 124. Accompanying control logic is not shown for ease of illustration. In an embodiment, the armed field 122 is equivalent to a valid status bit. In some embodiments, the armed field 122 is also used to ensure a store instruction issues prior to a dependent load instruction. In an embodiment, the field 124 stores a retirement group number (GNUM) corresponding to the store instruction in the particular table entry. In other embodiments, field 124 stores a combination of one or more of the GNUM corresponding to the store instruction, the architectural register ID of the second source operand and the architectural register ID of the first source operand.

As shown, an architectural register ID 126, rather than the program counter 132, is used for searching the table of the SP-LSD predictor 120. For store instructions, the source architectural register ID is used for searching entries of the table of the SP-LSD predictor 120. For store pair instructions, in an embodiment, the second source architectural register ID is used for searching the table of the SP-LSD predictor 120. For example, the source architectural register ID X23 of the third store instruction is used for searching the table of the SP-LSD predictor 120. For load instructions, the destination architectural register ID is used for searching the table of the SP-LSD predictor 120.

For load pair instructions, in an embodiment, the second destination architectural register ID is used for searching the table of the SP-LSD predictor 120. For example, the destination architectural register ID X19 of the second load instruction is used for searching the table of the SP-LSD predictor 120. In other embodiments, the first source or the first destination architectural register ID of store pair instructions and load pair instructions is used for searching the table of the SP-LSD predictor 120. In various embodiments, the SP-LSD predictor 120 does not use a repetitive training mechanism to start producing load-store predictions. Rather, first-time cold-occurrences of load-store dependency pairs provide predictions immediately.

As shown, multiplexer (Mux) gate 140 receives the predicted dependencies from each of the SP-LSD predictor 120 and the LSD predictor 130. In an embodiment, priority is given to SP-LSD predictor 120, so the hit status 134 is used by Mux gate 140 to select between the two received predictions. The selected predicted dependency 142 is sent to a load-store queue to be accessed in a later pipeline stage.

In some embodiments, determining whether a store instruction is a push instruction includes checking whether particular qualifying conditions are satisfied. For example, after decoding, the address operands of the store instruction are inspected to determine whether the store instruction is a stack push instruction. The address operands of the store instruction are used in a later execution pipeline stage to generate the store address. The address operands include an architectural register identifier (ID) used as a base register ID and an immediate value used as an offset.

Upon inspection, it may be determined that the store instruction has an address architectural register identifier (ID) matching a value of the stack pointer. If so, other conditions may be additionally checked to determine whether the store instruction is qualified as a stack push instruction to be used for a memory dependence prediction. In some embodiments, another condition is whether the store instruction is an integer instruction. Another condition is the store instruction does not include a zero register defined by the instruction set architecture to indicate a zero value. As described earlier, in an embodiment, the ISA includes a store pair instruction. When the store pair instruction is used, an additional condition checked to determine whether the store instruction is qualified as a stack push instruction is the pair of source registers identified by source register IDs store integer source operands. A further condition is the source register IDs are adjacent numbers.

Figure 2:
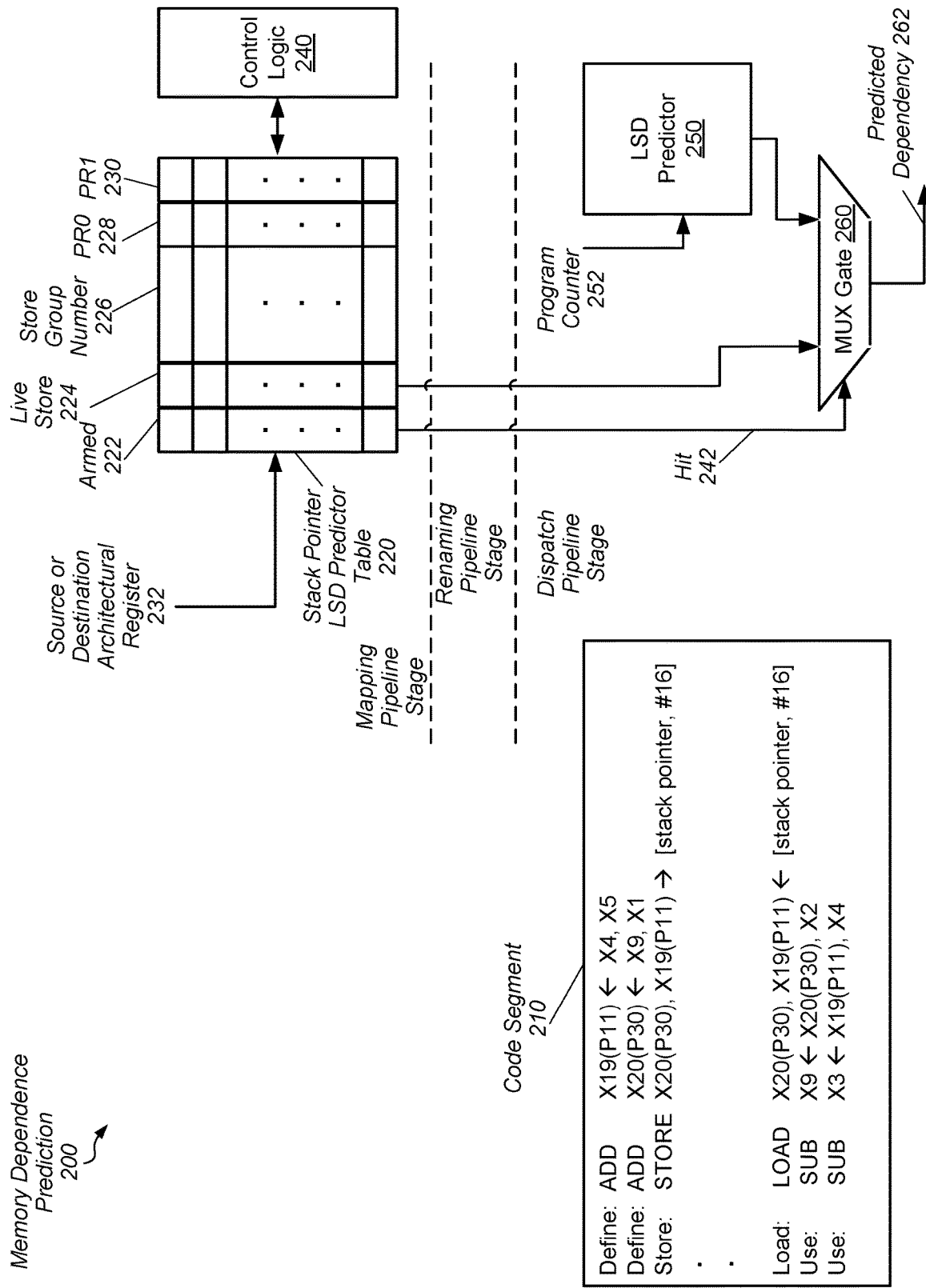
FIG. 2 is a block diagram of another embodiment of memory dependence prediction.

Turning to FIG. 2, a generalized block diagram illustrating one embodiment of memory dependence prediction 200 is shown. In the illustrated embodiment, code segment 210 includes multiple instructions in a computer program. As shown, the data propagation delay is shown for a given architectural register X19 begins with Define followed by Store followed by Load and ending with Use. Similarly, the data propagation delay for the architectural register X20 is shown.

In the illustrated embodiment, the Define portion of code segment 210 includes ADD arithmetic operations. The Store portion of code segment 210 includes a store pair instruction with architectural register IDs X20 and X19 as source operands. In addition, the store pair instruction includes address operands with the stack pointer as the address architectural register and an immediate value indicated by #16. The Load portion of code segment 210 includes a load pair instruction with architectural register IDs X20 and X19 as destination operands. In addition, the load pair instruction includes address operands with the stack pointer as the address architectural register and an immediate value indicated by #16. The Use portion of code segment 210 includes SUB arithmetic operations.

In the illustrated embodiment, the SP-LSD predictor includes SP-LSD predictor table 220 with fields 222-230. In an embodiment, fields 222 and 226 store information equivalent to fields 122 and 124 of SP-LSD table 120 (of FIG. 1). Field 224 is set when a corresponding table entry is allocated, and similar to field 222, it is cleared when a load instruction (pop instruction) is predicted to be dependent upon the store instruction (push instruction). However, unlike field 222, if a load instruction (pop instruction) is not predicted to be dependent upon the store instruction (push instruction), the live store field 224 is not cleared when the store instruction issues. Rather, the live store field 224 is cleared when the store instruction is retired, thus allowing the information in the table entry to continue to be used for memory dependence prediction after the store instruction is issued.

In various embodiments, fields 228-230 store one or more physical register IDs assigned to the one or more source operands of the store instruction for register renaming purposes. Control logic 240 includes combinatorial logic and sequential elements for controlling access to SP-LSD predictor table 220. In addition, control logic 240 updates information stored in SP-LSD predictor table 220 and determines which table entries are allocated and also deallocated.

As shown, an architectural register ID 232, rather than the program counter 252, is used for searching the table of the SP-LSD 220. For store instructions, the source architectural register ID is used for searching the SP-LSD predictor table 220. For load instructions, the destination architectural register ID is used for searching the SP-LSD predictor table 220. For store pair instructions and load pair instructions, searching the SP-LSD predictor table 220 may be performed in one of the multiple manners described earlier for the table of SP-LSD predictor 120.

In various embodiments, the SP-LSD predictor table 220 and control logic 240 do not use a repetitive training mechanism to start producing load-store predictions. Rather, first-time cold-occurrences of load-store dependency pairs provide predictions immediately. Similar to LSD predictor 130, a program counter (PC) is used when searching LSD predictor 250. The search using the PC will result in a misprediction and training is used for the sequence in code segment 210. As shown, multiplexer (Mux) gate 260 receives the predicted dependencies from each of the SP-LSD predictor table 220 and the LSD predictor 250. In an embodiment, priority is given to SP-LSD predictor table 220, so the hit status 242 is used by Mux gate 260 to select between the two received predictions. The selected predicted dependency 262 is sent to a load-store queue to be accessed in a later pipeline stage.

In various embodiments, the table entries of SP-LSD predictor table 220 are allocated by a store instruction that is determined to be a stack push instruction. If the stack push instruction hits in the SP-LSD predictor table 220, then the hit entry is overwritten with information of the store instruction. If a stack push instruction misses in SP-LSD predictor table 220, then an available invalid entry or an evicted entry is written with information of the store instruction. As described earlier, the stack push instruction satisfies particular qualifying conditions. In an embodiment, these qualifying conditions are the same conditions described earlier for the table of SP-LSD predictor 120. A given table entry is deallocated when a load instruction that satisfies qualifying conditions hits on the given table entry. Control logic 240 will allocate a table entry in SP-LSD predictor table 220 for the store pair instruction in code segment 210. As shown, each of the two source operands are renamed using the physical register IDs (register rename IDs) P30 for X20 and P11 for X19.

When the subsequent load instruction in code segment 210 hits in SP-LSD predictor table 220, in one embodiment, the physical register IDs P30 and P11 are read from fields 228-230 of the hit table entry and used to rename the destination architectural register IDs for the load instruction. Therefore, no new physical register IDs (rename register IDs) are obtained from a free list. In such an embodiment, there is available support for maintaining a duplicate count of mappings for a given physical register number. In addition, the load instruction is marked as a zero cycle load (ZCL) instruction. As used herein, a zero cycle load instruction refers to a load instruction that does not access data associated with the source operand of the store instruction upon which the load instruction has a read after write (RAW) data dependency. In various embodiments, the mark is used to prevent the load instruction from accessing (reading) data associated with the source operand of the store instruction. Due to the duplicate renaming, this data may be forwarded from a physical register file to instructions that are younger (in program order) and dependent on the marked load instruction. Therefore, zero execution pipeline stages are used for the load instruction to obtain the data requested by the load instruction. In a later pipeline stage, the predicted memory dependence may be verified. If the memory dependence is correct, then the marked load instruction may be considered complete without reading operand data from memory (data cache) or from the store buffer. If the memory dependence is incorrect, then the marked load instruction and younger (in program order) instructions may be flushed from the pipeline and replayed.

As shown, in one embodiment, accessing SP-LSD predictor table 220 occurs in an earlier pipeline stage (mapping pipeline stage) than a register renaming pipeline stage as well as earlier than LSD predictor 250 is accessed. In another embodiment, SP-LSD predictor table 220 is accessed in another pipeline stage, which is still earlier than a pipeline stage when LSD predictor 250 is accessed. For example, SP-LSD predictor table 220 may be accessed during the register renaming pipeline stage. In an embodiment, the load instruction also carries a copy of the GNUM value from field 226 for the store instruction in later pipeline stages to maintain program ordering. In an embodiment, the hit access by the load instruction causes control logic 240 to clear both the armed field 222 and the live store field 224 of the hit table entry.

In some embodiments, when a given store instruction and a given load instruction are in a same decode group being decoded in the same decode pipeline stage, load-store dependency prediction is not performed. In an embodiment, the given store instruction allocates an entry in SP-LSD predictor table 220 and sets the armed field 222, but the given load instruction does not receive the forwarded physical register IDs of the given store instruction. However, in other embodiments, the load-store dependency prediction is performed.

In an embodiment, the load-store dependency prediction is verified by inspecting the store queue. When the load instruction marked as a zero cycle load is issued to the load queue, at least the GNUM or other identifier of the producer store instruction is used when searching the store queue. In an embodiment, if the store instruction is found in the store queue, then the load-store dependency prediction is considered correct. The load instruction receives its requested data via store-to-load forwarding (STLF) from this store instruction with the GNUM or other identifier. Otherwise, the load-store dependency prediction is considered incorrect, and a backend flush is marked for this load instruction. During the flush, the GNUM or other identifier of the load instruction is used to flush the load instruction and all other instructions younger in program order than the load instruction from each pipeline stage.

Not finding the producer store instruction in the store queue is one source of a load-store dependency misprediction. Another source is the producer store instruction has an address mismatch with the consumer load instruction. Yet another source is there are intervening instructions between the producer store instruction and the consumer load instruction that is supplying a portion or all the data requested by the consumer load instruction. Examples of the intervening instructions are other store instructions, arithmetic instructions, register-to-register move instructions, and so forth. When any of these sources are determined, a backend flush is triggered.

In some embodiments, when a misprediction is determined, a global counter is updated. In some embodiments, the global counter is incremented from an initial zero value. In other embodiments, the global counter is decremented from an initial non-zero value. In an embodiment, when the global counter reaches a threshold value, the SP-LSD predictor is shut off. In some embodiments, when the SP-LSD predictor is shut off, the SP-LSD predictor is turned on again after a count of a number of instructions (or micro-ops) has been reached. In one embodiment, the threshold number of mispredictions is 32 and the threshold number of retired instructions is 4,000. However, in other embodiments, other values for these threshold numbers are possible and contemplated.

Figure 3:
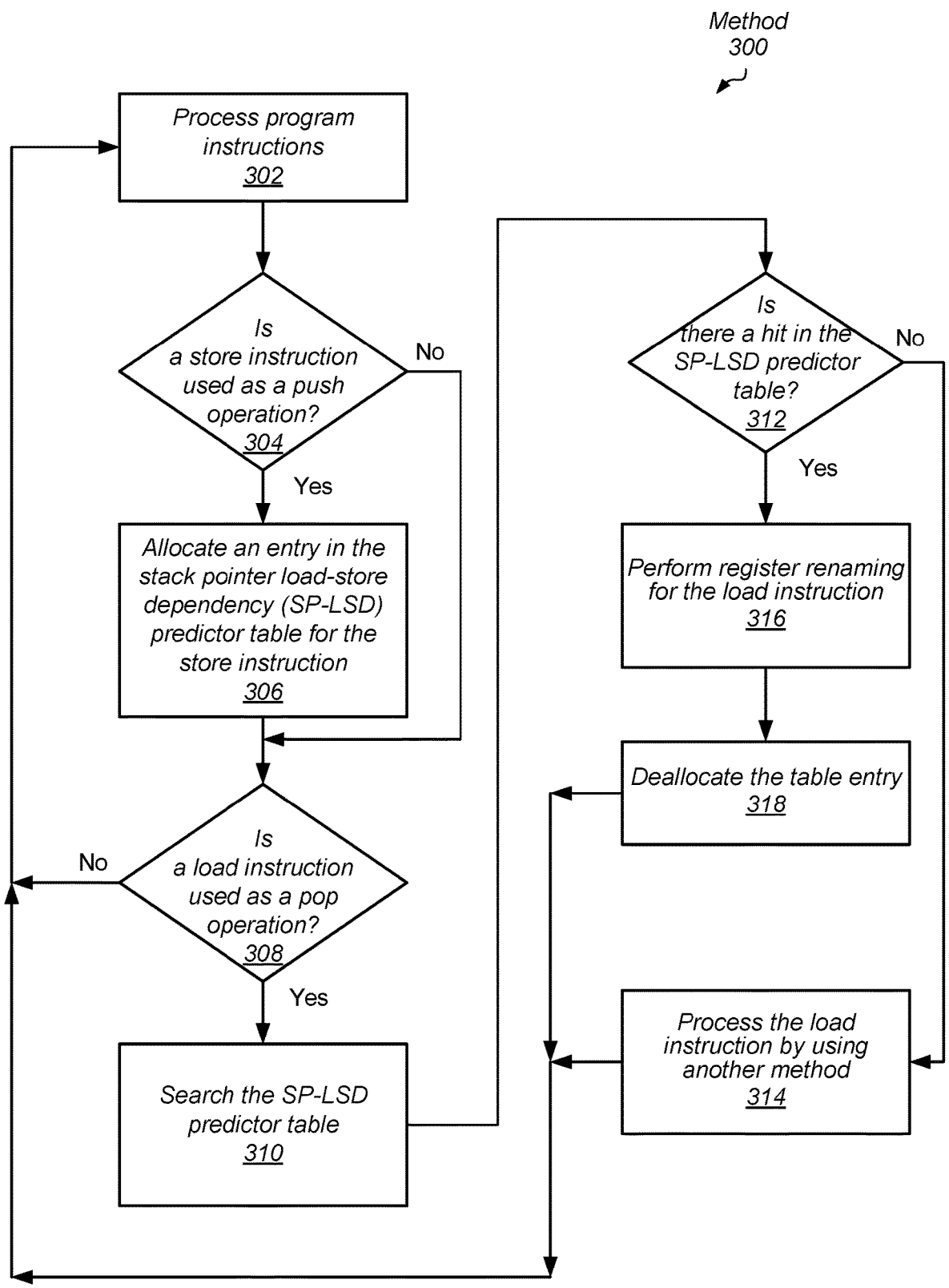
FIG. 3 is a flow diagram of one embodiment of a method for predicting a memory dependence.

Referring now to FIG. 3, a generalized flow diagram of one embodiment of a method 300 for predicting a memory dependence is shown. For purposes of discussion, the steps in this embodiment (as well as for FIGS. 4, 7-8, and 10-12) are shown in sequential order. However, in other embodiments some steps may occur in a different order than shown, some steps may be performed concurrently, some steps may be combined with other steps, and some steps may be absent.

In block 302, program instructions are processed. The instructions may be compiled, fetched from memory, decoded and executed. After decoding, a store instruction may be determined to be a stack push instruction. In an embodiment, the address operands of the store instruction are inspected to determine whether the store instruction is a stack push instruction. The address operands of the store instruction are used in a later execution pipeline stage to generate the store address. The address operands include an architectural register identifier (ID) used as a base register ID and an immediate value used as an offset.

Upon inspection, it may be determined that the store instruction has an address architectural register identifier (ID) matching a value of the stack pointer. If so, other conditions may be additionally checked to determine whether the store instruction is qualified as a stack push instruction to be used for a memory dependence prediction. In some embodiments, another condition is the store instruction is an integer instruction. Another condition is the store instruction does not include a zero register defined by the instruction set architecture to indicate a zero value.

In some embodiments, the instruction set architecture includes a store pair instruction that receives a pair of source operands and stores the two source operands in an address calculated from the address operands. In an embodiment, the two source operands are two 32-bit words or two 64-bit double words. As described earlier, the address is calculated from the address operands, such as the architectural register identifier (ID) used as a base register ID and an immediate value used as an offset a base register value and an immediate offset. When the store pair instruction is used, an additional condition is checked to determine whether the store instruction is qualified as a stack push instruction is the pair of source registers identified by source register IDs store integer source operands. A further condition is whether the source register IDs are adjacent numbers.

If a store instruction is determined to be a push operation ("yes" branch of the conditional block 304), then an entry is allocated in the stack pointer load-store dependency (SP-LSD) predictor table for the store instruction (block 306). In various embodiments, each table entry includes one or more fields such as the fields of RF-LSD predictor table 520 (of FIG. 5). In an embodiment, each table entry includes at least an armed field, which is equivalent to a valid status bit. In one embodiment, the armed field is also used to ensure a store instruction issues prior to a dependent load instruction. The table entry also includes a field for storing a source architectural register ID. For store pair instructions, in an embodiment, this field stores the register ID of the second source operand. In other embodiments, this field stores the register ID of the first source operand. In yet other embodiments, each of the two source architectural register IDs is stored in the table entry.

In an embodiment, each table entry also stores a retirement group number (GNUM) corresponding to the store instruction in the particular table entry. In some embodiments, each table entry also stores one or more physical register IDs assigned to the one or more source operands. Afterward, control flow of method 300 moves to conditional block 308. Similarly, if the store instruction is not determined to be a push operation ("no" branch of the conditional block 304), then control flow of method 300 moves to conditional block 308.

After decoding, a load instruction may be determined to be a stack pop instruction. Similar to the processing of a store instruction, in an embodiment, the address operands of the load instruction are inspected to determine whether the load instruction is a stack pop instruction. The address operands of the load instruction are used in a later execution pipeline stage to generate the load address. The address operands include an architectural register identifier (ID) used as a base register ID and an immediate value used as an offset.

Upon inspection, it may be determined that the load instruction has an address architectural register identifier (ID) matching a value of the stack pointer. If so, other conditions may be additionally checked to determine whether the load instruction is a stack pop instruction to be used for a memory dependence prediction. In various embodiments, these other conditions are similar to the conditions described earlier for the store instruction. If a load instruction is not determined to be a pop operation ("no" branch of the conditional block 308), then control flow of method 300 returns to block 302 where instructions are processed such as instructions are compiled, fetched from memory, decoded and executed.

If a load instruction is determined to be a pop operation ("yes" branch of the conditional block 308), then the SP-LSD predictor table is searched (block 310). In one embodiment, the SP-LSD predictor table is searched by using at least a destination architectural register ID of the load instruction. If the search of the SP-LSD predictor table results in a miss ("no" branch of the conditional block 312), then the load instruction is processed by using another method (block 314). In one embodiment, the load instruction is issued without any speculative execution from memory dependence prediction. In another embodiment, the load instruction is processed by searching a separate load-store dependency (LSD) predictor table using the program counter of the load instruction. A hit in the separate LSD table predicts the load instruction has a memory dependence on a particular store instruction and the load instruction is processed with speculative execution afterward.

If the search of the SP-LSD predictor table results in a hit ("yes" branch of the conditional block 312), then register renaming is performed for the load instruction (block 316). In one embodiment, each destination architectural register identifier (ID) of the load instruction is renamed with a physical register ID found in the hit table entry. The one or more physical register IDs were already assigned to one or more source operands of a store instruction. Afterward, the table entry is deallocated (block 318). For example, the armed field is cleared. In an embodiment, when the armed field is still set, the armed field is also cleared when the corresponding store instruction issued.

Figure 4:
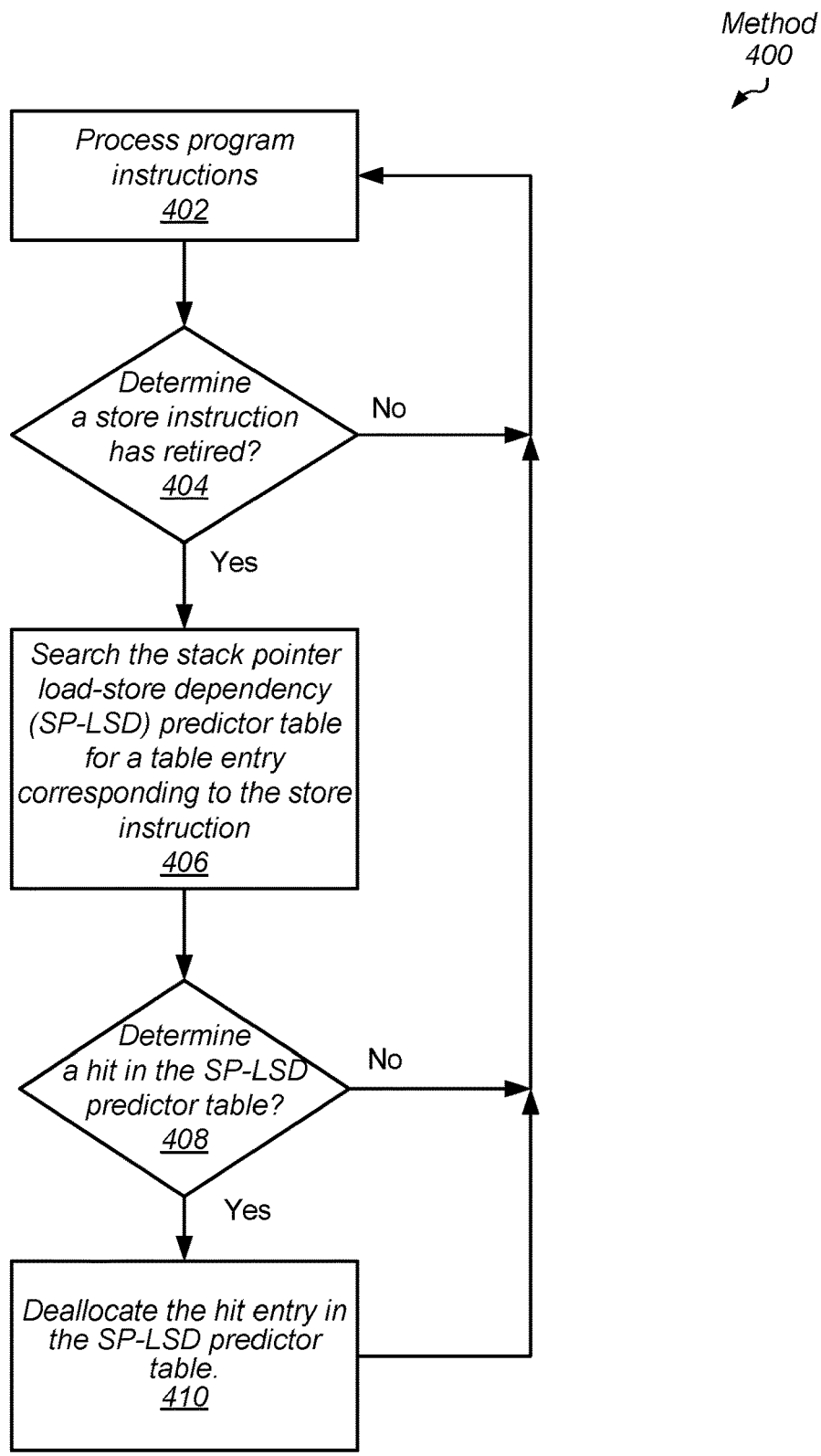
FIG. 4 is a flow diagram of one embodiment of a method for updating information used to predict a memory dependence.

Referring now to FIG. 4, a generalized flow diagram of one embodiment of a method 400 for deallocating memory dependence information for a retired store instruction is shown. In block 402, program instructions are processed. The instructions may be compiled, fetched from memory, decoded and executed. If a store instruction is determined to retire ("yes" branch of the conditional block 404), then the stack pointer load-store dependency (SP-LSD) predictor table is searched for a table entry corresponding to the store instruction (block 406). In an embodiment, a retirement group number (GNUM) of the store instruction is used when searching the SP-LSD predictor table. If the store instruction is a store pair instruction, then in some embodiments, one or both of the source architectural register IDs are used when searching the SP-LSD predictor table. In some embodiments, a retirement group number (GNUM) of the store instruction being retired is used when searching the SP-LSD predictor table. One or more of the above values may be combined and the combination is used for searching the SP-LSD predictor table.

If the search of the SP-LSD predictor table results in a miss ("no" branch of the conditional block 408), then control flow of method 400 returns to block 402 where instructions are processed such as instructions are compiled, fetched from memory, decoded and executed. If the search of the SP-LSD predictor table results in a hit ("yes" branch of the conditional block 408), then the hit entry in the SP-LSD predictor table is deallocated (block 410).

Figure 5:
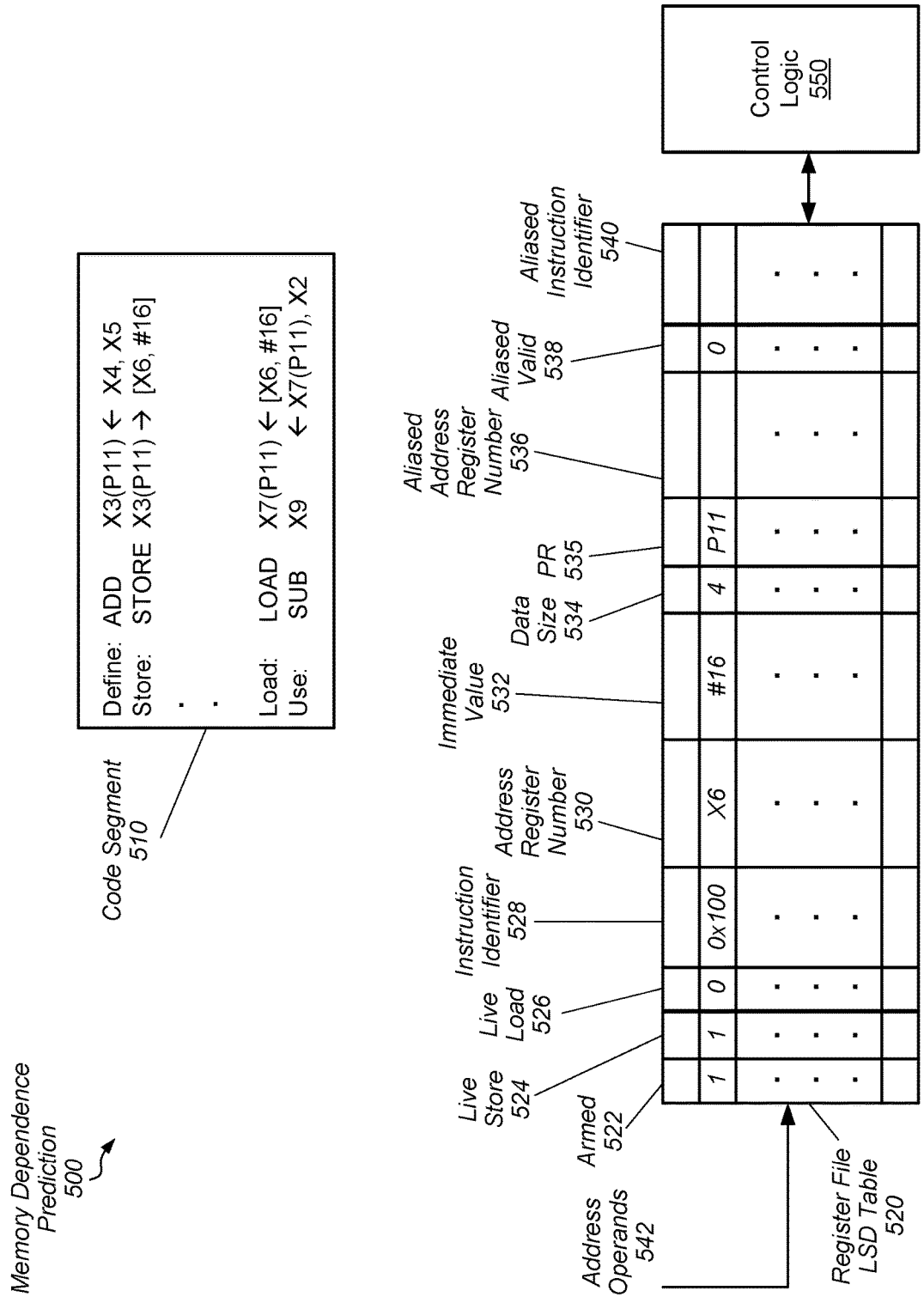
FIG. 5 is a block diagram of one embodiment of memory dependence prediction.

Turning to FIG. 5, a generalized block diagram illustrating one embodiment of memory dependence prediction 500 is shown. In the illustrated embodiment, code segment 510 includes multiple instructions in a computer program. As shown, the data propagation delay is shown for a given architectural register X3 begins with Define followed by Store followed by Load and ending with Use.

In the illustrated embodiment, the Define portion of code segment 510 includes an ADD arithmetic operation. The Store portion of code segment 510 includes a store instruction with architectural register ID X3 as a source operand. In addition, the store instruction includes address operands with the address architectural register ID X6 and an immediate value indicated by #16. The Load portion of code segment 510 includes a load instruction with architectural register ID X7 as a destination operand. In addition, the load instruction includes the same address operands as the store instruction. The Use portion of code segment 510 includes the SUB arithmetic operation.

A register file (RF) LSD predictor, which includes RF-LSD table 520 and control logic 550, is used to predict load-store dependencies for particular load-store pairs. Some qualifying conditions for making a given store instruction or a given load instruction a candidate for dependency prediction includes either a store instruction has an integer source operand or a load instruction has an integer destination operand. Additionally, it is determined an address architectural register identifier (ID) does not match a value of the stack pointer. In some embodiments, it is determined the store instruction or the load instruction is not a store pair instruction or a load pair instruction, respectively.

In an embodiment, another condition is no table entry is already allocated in a register file load-store dependency (RF-LSD) predictor table 520 for the store instruction or the load instruction. In one embodiment, one or more of the address operands 542 are used for searching the RF-LSD predictor table 520. The address operands 542 include at least an address architectural register ID of a store instruction or a load instruction. In another embodiment, a retirement group number (GNUM) of the store instruction or the load instruction is used during the search of the RF-LSD predictor table 520. In other embodiments, a combination of one or more of these values and other values is used when searching the RF-LSD predictor table 520. If a hit occurs, then information in the hit entry of the RF-LSD predictor table 520 is overwritten (updated) with information associated with the current instruction.

Depending on a number of ports for the RF-LSD predictor table 520, in an embodiment, a single instruction of a candidate store instruction and a candidate load instruction is selected for searching the RF-LSD predictor table 520. In other embodiments, each of the candidate store instruction and the candidate load instruction is selected for searching the RF-LSD predictor table 520. In the illustrated embodiment, the register file (RF) LSD predictor includes RF-LSD table 520 with fields 522-540. In an embodiment, fields 522, 524, 528, 530 and 535 are equivalent to fields 222-230 of SP-LSD predictor table 220 (of FIG. 2). Control logic 550 includes combinatorial logic and sequential elements for controlling access to RF-LSD predictor table 520. In addition, control logic 550 updates information stored in RF-LSD predictor table 520 and determines which table entries are allocated and also deallocated.

The live load field 526 is set when information in a load instruction is used to allocate a table entry and field 526 is cleared when the load instruction retires. Therefore, a consumer load instruction can be dependent on a producer load instruction. The fields 530 and 532 are the address operands and field 534 stores the data size being written or read. The physical register (PR) field 535 stores a physical register identifier assigned to a source operand of the store instruction for register renaming purposes. The aliased address register number field 536 stores the address register ID of the architectural register, which aliases the address architectural register ID stored in field 530. Aliasing may occur when an intervening register-to-register move instruction is used in the computer program between the producer memory instruction and the consumer memory instruction. The aliased valid field 538 is set when aliasing is determined. The aliased instruction identifier field 540 stores the GNUM or other identifier of the register-to-register move instruction that caused the aliasing.

Figure 6:
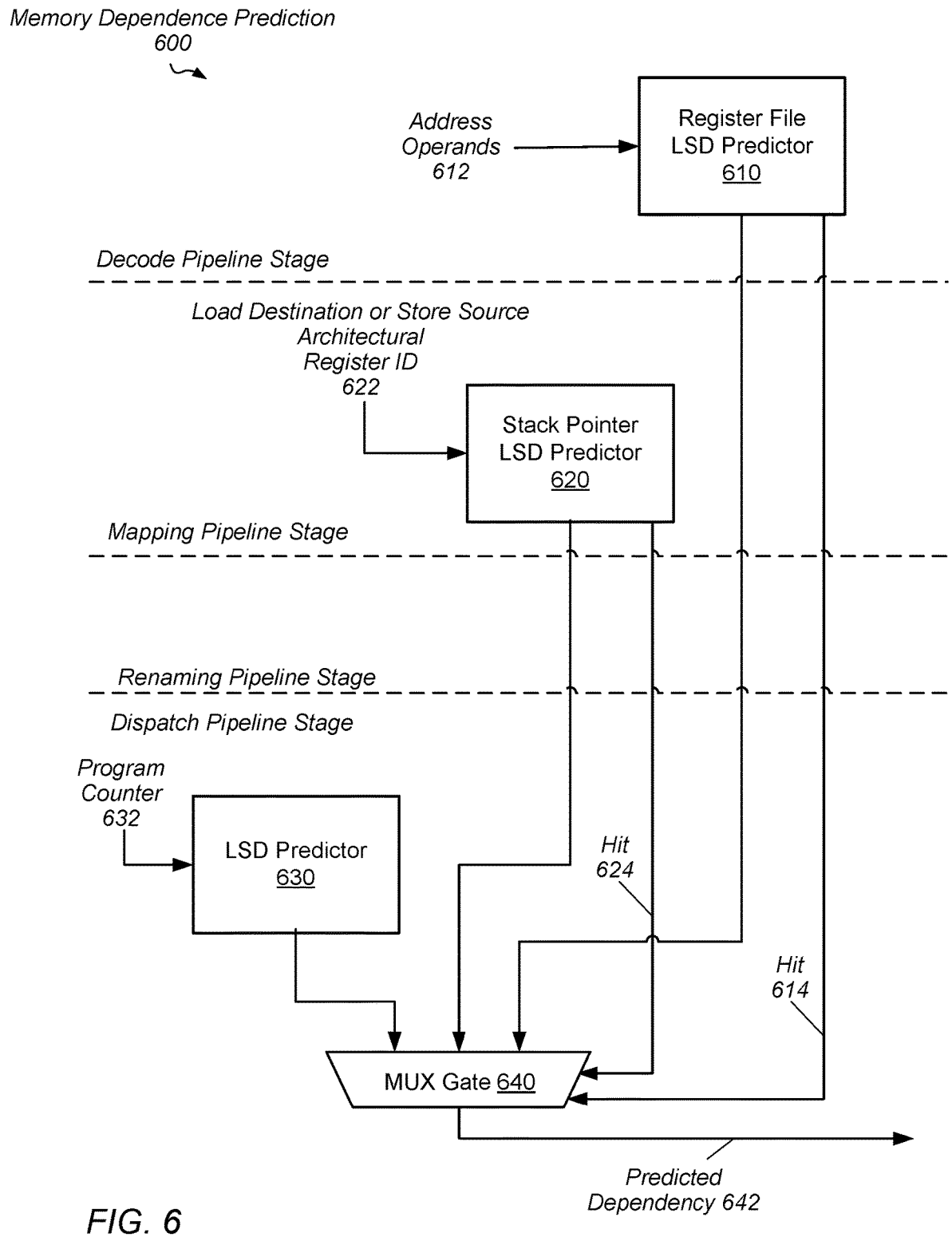
FIG. 6 is a block diagram of another embodiment of memory dependence prediction.

Turning to FIG. 6, a generalized block diagram illustrating one embodiment of memory dependence prediction 600 is shown. Three load-store dependency (LSD) predictors are shown. In various embodiments, each one of the predictors 610-630 includes one or more tables and control logic for controlling access and updates of the one or more tables. As shown, in an embodiment, one or more address operands 612, rather than the program counter 632, are used for searching register file (RF) LSD predictor 610. For store instructions, a source architectural register ID is used for searching RF-LSD predictor 610. For example, at least an address architectural register is used for searching RF-LSD predictor 610. Similarly, an architectural register ID 622, rather than the program counter 632, is used for searching stack pointer (SP) LSD predictor 620. As shown, in an embodiment, the program counter 632 is used for searching LSD Predictor 630.

In various embodiments, each of RF-LSD predictor 610 and SP-LSD predictor 620 do not use a repetitive training mechanism to start producing load-store predictions. Rather, first-time cold-occurrences of load-store dependency pairs provide predictions immediately. In contrast, LSD predictor 630 will mispredict and need training. As shown, multiplexer (Mux) gate 640 receives the predicted dependencies from each of the predictors 610-630. In an embodiment, first priority is given to RF-LSD predictor 610 and second priority is given to SP-LSD predictor 620. The status signals 614 and 624 are used by Mux gate 640 to select among the received predictions. The selected predicted dependency 642 is sent to a load-store queue to be accessed in a later pipeline stage. In the illustrated embodiment, each of RF-LSD predictor 610 and SP-LSD predictor 620 is accessed prior to the register renaming pipeline stage. As shown, in an embodiment, RF-LSD predictor 610 is accessed in the decode pipeline stage and SP-LSD predictor 620 is accessed in the mapping pipeline stage. In other embodiments, each of RF-LSD predictor 610 and SP-LSD predictor 620 is accessed in a same pipeline stage.

Figure 7:
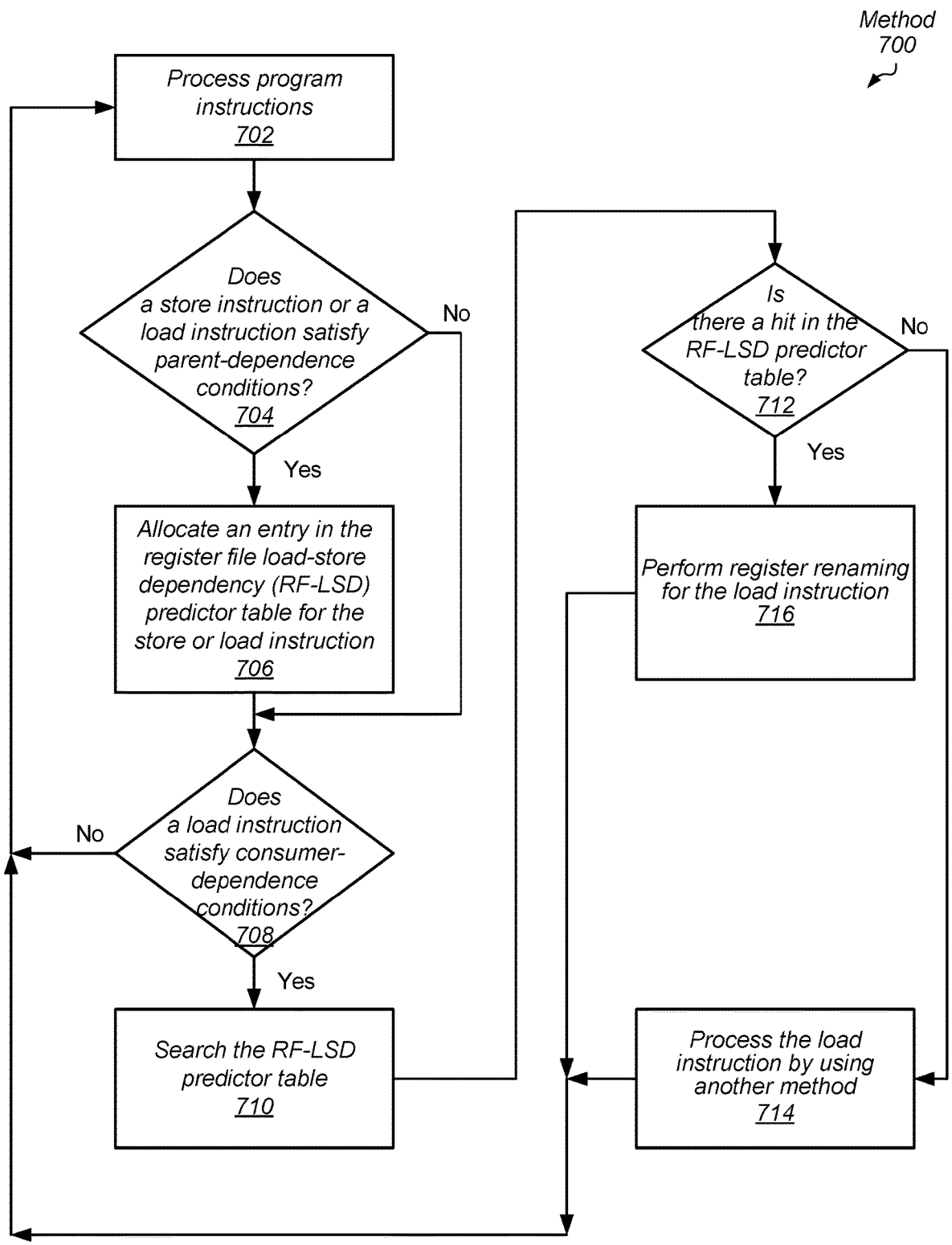
FIG. 7 is a flow diagram of one embodiment of a method for predicting a memory dependence.

Referring now to FIG. 7, a generalized flow diagram of one embodiment of a method 700 for predicting a memory dependence is shown. In block 702, program instructions are processed. The instructions may be compiled, fetched from memory, decoded and executed. After decoding, a store instruction or a load instruction may be determined to satisfy producer-dependence conditions. In some embodiments, a single instruction of a candidate store instruction and a candidate load instruction is selected for further qualifications. In other embodiments, each of the candidate store instruction and the candidate load instruction is selected for further qualifications. Upon inspection, it may be determined that either a store instruction has an integer source operand or a load instruction has an integer destination operand. Additionally, it is determined an address architectural register identifier (ID) does not match a value of the stack pointer. In some embodiments, it is determined the store instruction or the load instruction is not a store pair instruction or a load pair instruction, respectively.

In an embodiment, another producer-dependence condition is no table entry is already allocated in a register file load-store dependency (RF-LSD) predictor table for the store instruction or the load instruction. In one embodiment, one or more address operands of a store instruction or a load instruction are used for searching the RF-LSD predictor table. In another embodiment, a retirement group number (GNUM) of the store instruction or the load instruction is used for searching the RF-LSD predictor table. In other embodiments, a combination of one or more of these values is used for searching the RF-LSD predictor table. Depending on a number of ports for the RF-LSD predictor table, in some embodiments, a single instruction of a candidate store instruction and a candidate load instruction is selected searching the RF-LSD predictor table. In other embodiments, each of the candidate store instruction and the candidate load instruction is selected for searching the RF-LSD predictor table. If a hit occurs, then information in the hit entry is overwritten (updated) with information associated with the current instruction associated with the hit.

If a store instruction or a load instruction is determined to satisfy producer-dependence conditions ("yes" branch of the conditional block 704), then an entry is allocated in the register file load-store dependency (RF-LSD) predictor table for one or more of the store instruction or the load instruction (block 706). In various embodiments, each table entry includes one or more fields as RF-LSD predictor table 520 (of FIG. 5). After decoding, a load instruction may be determined to satisfy consumer-dependence conditions. In some embodiments, one or more of the parent-dependence conditions are checked, since they overlap consumer-dependence conditions.

If a load instruction is determined to satisfy consumer-dependence conditions ("yes" branch of the conditional block 708), then the RF-LSD predictor table is searched (block 710). In one embodiment, the RF-LSD predictor table is searched by using at least an address architectural register of the address operands of the load instruction. In another embodiment, the RF-LSD predictor table is searched by a combination of the address architectural register ID and the immediate value. Other status information may be used to determine a hit on a valid table entry such as the armed field, one of the live store field and the live load field, and a data size field.

If the search of the RF-LSD predictor table results in a miss ("no" branch of the conditional block 712), then the load instruction is processed by using another method (block 714). In one embodiment, the load instruction is issued without any speculative execution from memory dependence prediction. In another embodiment, the load instruction is processed by searching a separate load-store dependency (LSD) predictor table using the program counter of the load instruction. A hit in the separate LSD table predicts the load instruction has a memory dependence on a particular store instruction and the load instruction is processed with speculative execution afterward.

If the search of the RF-LSD predictor table results in a hit ("yes" branch of the conditional block 712), then a load-store memory dependence is predicted and register renaming is performed for the load instruction (block 716). In one embodiment, the destination architectural register identifier (ID) of the load instruction is renamed with a physical register ID found in the hit table entry. The physical register ID was already assigned to a source operand of a previous store instruction or a destination operand of a load instruction. Since a producer-dependence instruction may have multiple consumer-dependence instructions, the table entry is not deallocated.

Figure 8:
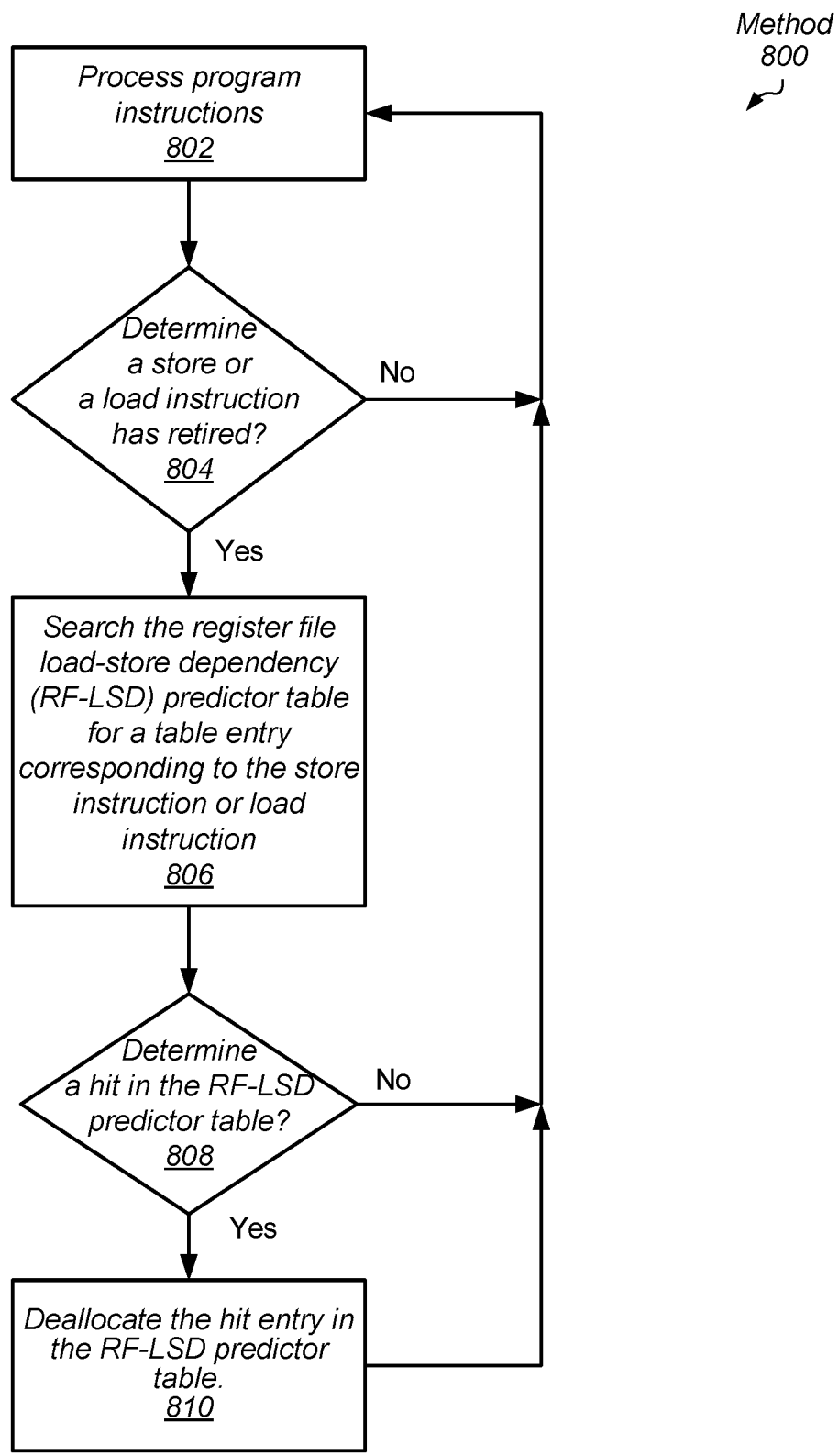
FIG. 8 is a flow diagram of one embodiment of a method for updating information used to predict a memory dependence.

Referring now to FIG. 8, a generalized flow diagram of one embodiment of a method 800 for deallocating memory dependence information for a retired store instruction is shown. In block 802, program instructions are processed. The instructions may be compiled, fetched from memory, decoded and executed. If a store instruction or a load instruction is determined to retire ("yes" branch of the conditional block 804), then the register file load-store dependency (RF-LSD) predictor table is searched for a table entry corresponding to the store instruction or the load instruction (block 806).

In an embodiment, a retirement group number (GNUM) of the retiring store instruction or load instruction is used for searching the SP-LSD predictor table. In another embodiment, the RF-LSD predictor table is searched by using one or more of the address operands such as the address architectural register ID and the immediate value. Other status information may be used to determine a hit on a valid table entry such as one of the live store field and the live load field, and a data size field. One or more of the above values may be combined and the combination is used for searching the RF-LSD predictor table.

If the search of the RF-LSD predictor table results in a miss ("no" branch of the conditional block 808), then control flow of method 800 returns to block 802 where instructions are processed such as instructions are compiled, fetched from memory, decoded and executed. If the search of the RF-LSD predictor table results in a hit ("yes" branch of the conditional block 808), then the hit entry in the RF-LSD predictor table is deallocated (block 810).

Figure 9:
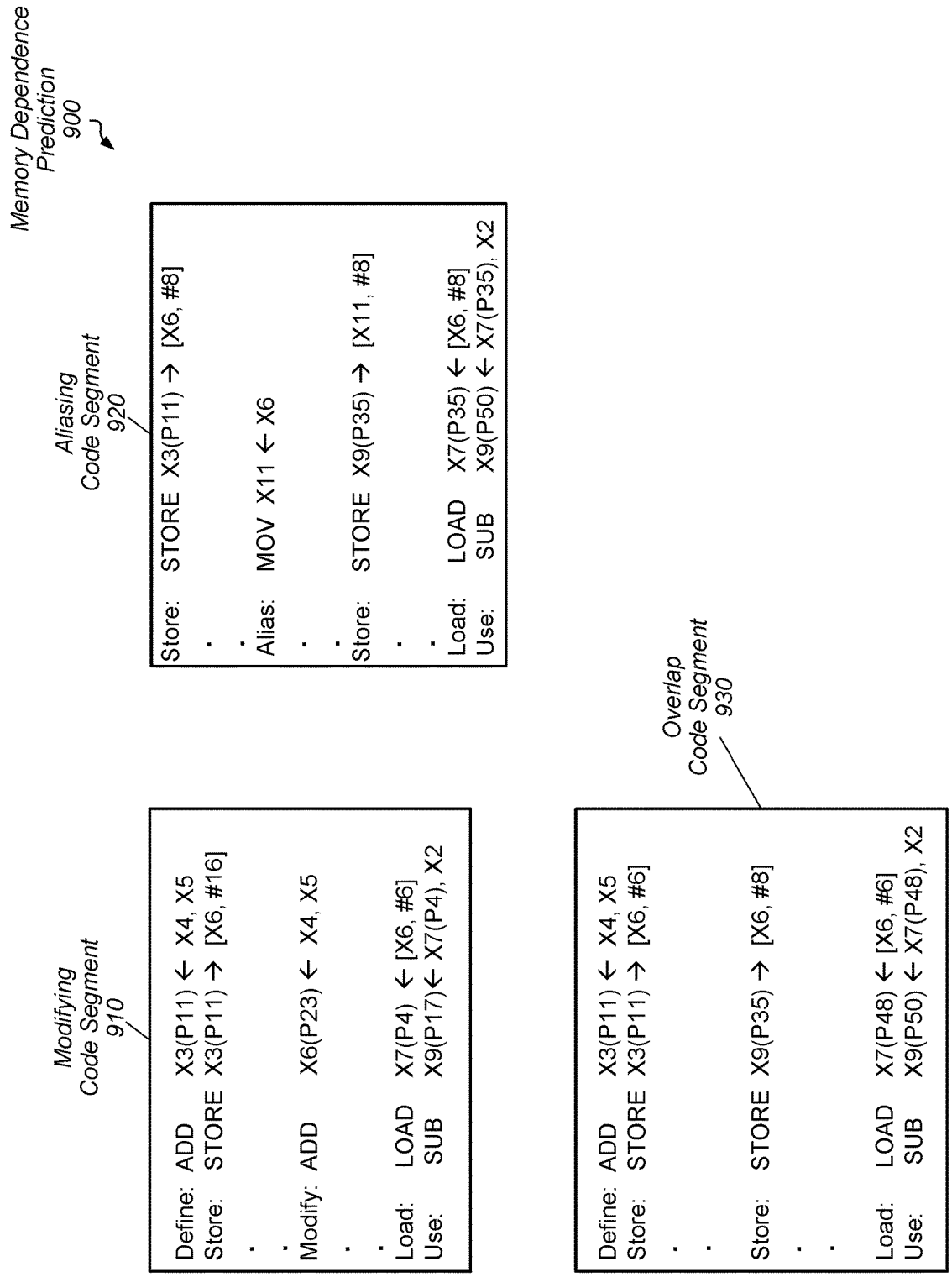
FIG. 9 is a block diagram of one embodiment of code segments illustrating cases for memory dependence prediction.

Turning to FIG. 9, a generalized block diagram illustrating one embodiment of code segments 900 illustrating cases for memory dependence prediction is shown. As shown, each of code segments 910-930 includes multiple instructions in a computer program. Code segment 910 illustrates an intervening arithmetic instruction between the producer memory instruction and the consumer memory instruction. The intervening arithmetic ADD instruction modifies the value stored in the architectural register identified by address architectural register ID X6. Steps to account for the modification are described later regarding method 1000 (of FIG. 10).

Code segment 920 illustrates an intervening aliasing instruction between the producer memory instruction and the consumer memory instruction. The intervening aliasing move instruction copies the contents stored in the architectural register identified by address architectural register ID X6. Steps to account for the modification are described later regarding method 1100 (of FIG. 11). Code segment 930 illustrates an intervening and write overlapping instruction between the producer memory instruction and the consumer memory instruction. The write overlapping instruction overwrites a portion or all of the contents stored in the architectural register identified by address architectural register ID X6. Steps to account for the modification are described later regarding method 1200 (of FIG. 12).

Figure 10:
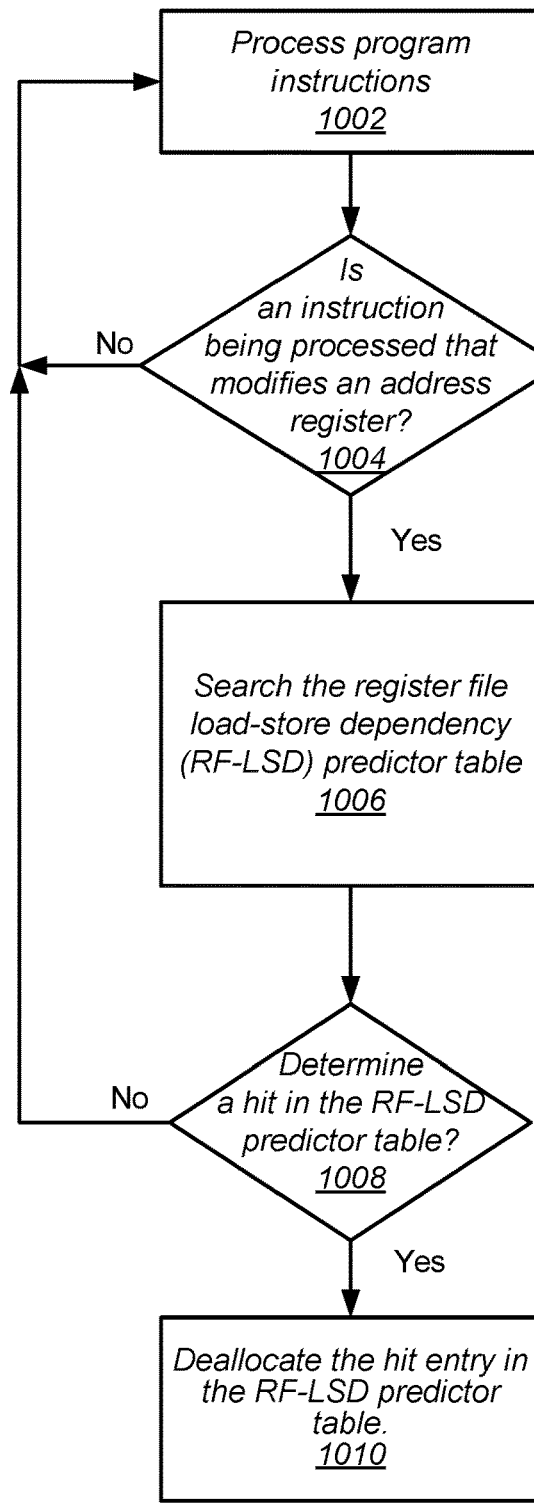
FIG. 10 is a flow diagram of another embodiment of a method for updating information used to predict a memory dependence.

Referring now to FIG. 10, a generalized flow diagram of one embodiment of a method 1000 for determining modification is performed by an intervening instruction between a producer-dependence instruction and a consumer-dependence instruction is shown. In block 1002, program instructions are processed. The instructions may be compiled, fetched from memory, decoded and executed. Particular instructions have a destination register that can be used as an address register for load instructions and store instructions. Examples of these particular instructions are arithmetic instructions and load instructions although other instruction types are possible and contemplated. If an instruction is being processed that modifies an address register for a memory access instruction ("yes" branch of the conditional block 1004), then the register file load-store dependency (RF-LSD) predictor table is searched (block 1006). In an embodiment, the RF-LSD predictor table is searched by using a destination architectural register ID of the arithmetic instruction. In various embodiments, the destination architectural register ID of the arithmetic instruction is compared against the address architectural register ID in table entries.

If the search of the RF-LSD predictor table results in a miss ("no" branch of the conditional block 1008), then control flow of method 1000 returns to block 1002 where instructions are processed such as instructions are compiled, fetched from memory, decoded and executed. If the search of the RF-LSD predictor table results in a hit ("yes" branch of the conditional block 1008), then the hit entry in the RF-LSD predictor table is deallocated (block 1010). In some embodiments, a hit occurs for multiple entries of the RF-LSD predictor table and each of the multiple hit entries is deallocated.

Figure 11:
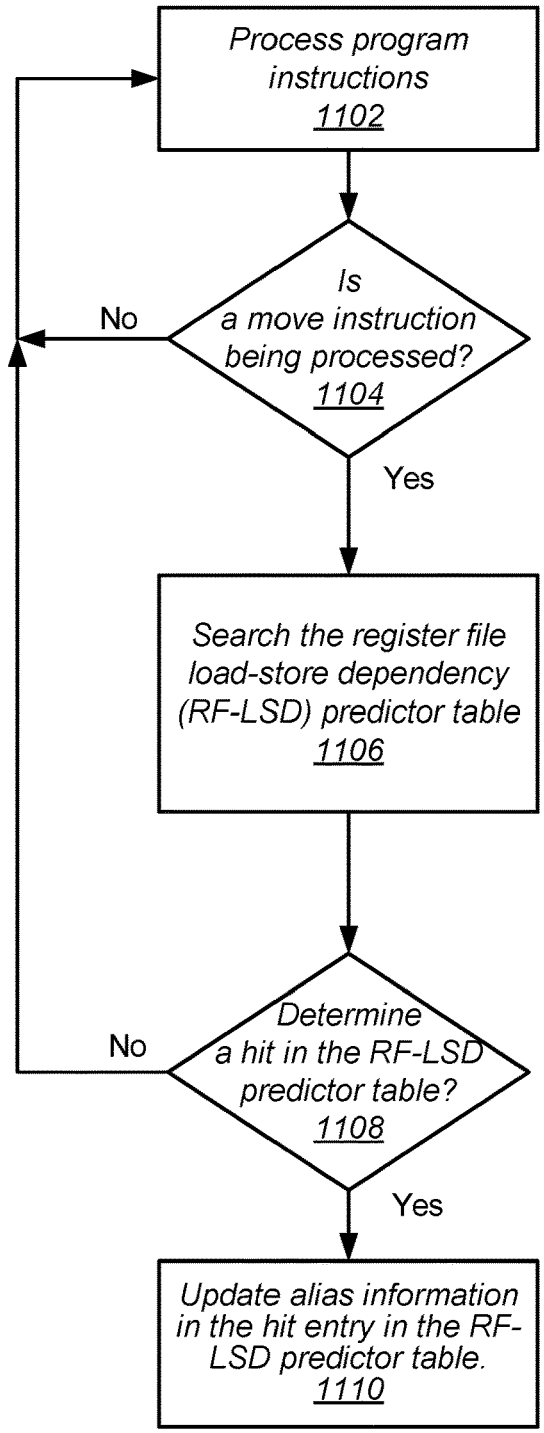
FIG. 11 is a flow diagram of another embodiment of a method for updating information used to predict a memory dependence.

Referring now to FIG. 11, a generalized flow diagram of one embodiment of a method 1100 for determining register aliasing is performed by an intervening instruction between a producer-dependence instruction and a consumer-dependence instruction is shown. In block 1102, program instructions are processed. The instructions may be compiled, fetched from memory, decoded and executed. If a register-to-register move instruction is being processed ("yes" branch of the conditional block 1104), then the register file load-store dependency (RF-LSD) predictor table is searched (block 1106). In an embodiment, at least a source architectural register ID of the move instruction is used when searching the RF-LSD predictor table. In some embodiments, the source architectural register ID of the move instruction is compared against the address architectural register IDs of load instructions stored in table entries.

If the search of the RF-LSD predictor table results in a miss ("no" branch of the conditional block 1108), then control flow of method 1100 returns to block 1102 where instructions are processed such as instructions are compiled, fetched from memory, decoded and executed. If the search of the RF-LSD predictor table results in a hit ("yes" branch of the conditional block 1108), then the hit entry in the RF-LSD predictor table has information updated (block 1110). For example, the aliased valid field is asserted as well as each of the aliased address register ID field and the aliased instruction identifier, which identifies the move instruction, is updated. In an embodiment, the aliased instruction identifier is the retirement group number (GNUM) corresponding to the move instruction.

Figure 12:
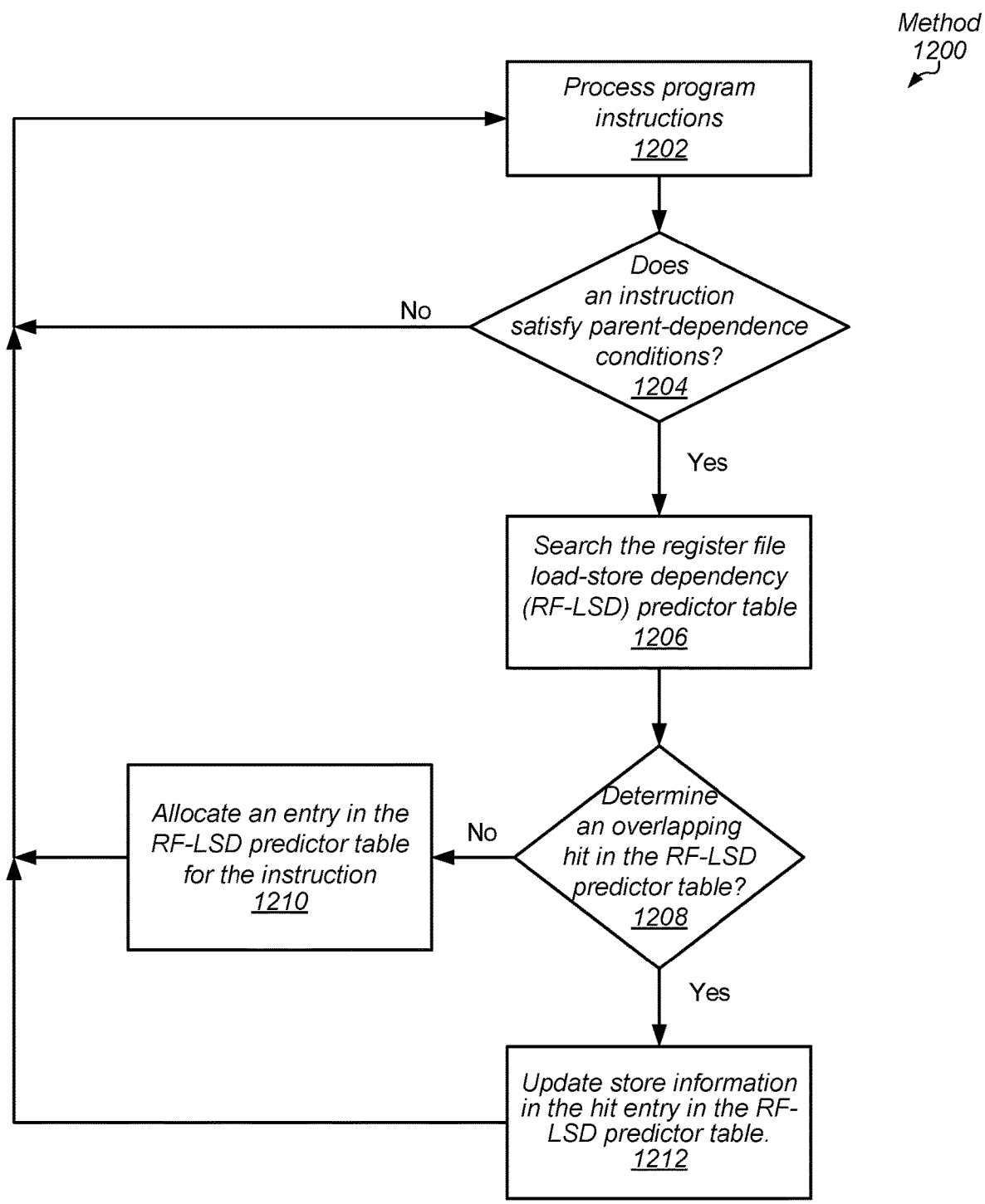
FIG. 12 is a flow diagram of another embodiment of a method for updating information used to predict a memory dependence.

Referring now to FIG. 12, a generalized flow diagram of one embodiment of a method 1200 for determining an overlapping write is performed by an intervening instruction between a producer-dependence instruction and a consumer-dependence instruction is shown. In block 1202, program instructions are processed. The instructions may be compiled, fetched from memory, decoded and executed. After decoding, a store instruction may be determined to satisfy producer-dependence conditions. The conditions described earlier for conditional block 704 of method 700 (of FIG. 7) may be used.

If an instruction is determined to satisfy producer-dependence conditions ("yes" branch of the conditional block 1204), then the register file load-store dependency (RF-LSD) predictor table is searched (block 1206). In various embodiments, the instruction that satisfies producer-dependence conditions is a memory access operation such as a store instruction or a load instruction. In an embodiment, the RF-LSD predictor table is searched by using at least an address architectural register ID of the instruction. In some embodiments, at least the address architectural register ID of the instruction is compared against the address architectural register ID in table entries. In addition, in some embodiments, it is determined whether table entries store information for producer-dependence store instructions rather than producer-dependence load instructions. For example, an indication may be stored in the table entry that specifies whether the producer-dependence instruction allocated for the table entry is a store instruction or a load instruction. Further, the immediate value and data size of the store instruction are compared against similar values in the table entries. The instruction may overwrite a memory location to be written by a younger instruction in program order. The instruction may overwrite a portion or all of the data in the memory location to be written by the younger instruction in program order. The overwriting condition may be referred to as an overlapping hit since the same memory location is written by each of the younger instruction and the current instruction.

If the search of the RF-LSD predictor table does not result in an overlapping hit ("no" branch of the conditional block 1208), then the instruction is processed by allocating a table entry for the store instruction in the RF-LSD predictor table (block 1210). For example, as described earlier for method 700 (of FIG. 7), if the instruction satisfies conditions for a producer-dependence store instruction, then a table entry is allocated. If the search of the RF-LSD predictor table results in an overlapping hit ("yes" branch of the conditional block 1208), then the hit entry in the RF-LSD predictor table has information updated (block 1212). For example, the immediate value field is updated with the immediate value of the current instruction. In addition, an identifier, such as the retirement group number (GNUM) corresponding to the current instruction, is inserted in the hit table entry. Another physical register ID is also inserted in the hit table entry.

Figure 13:
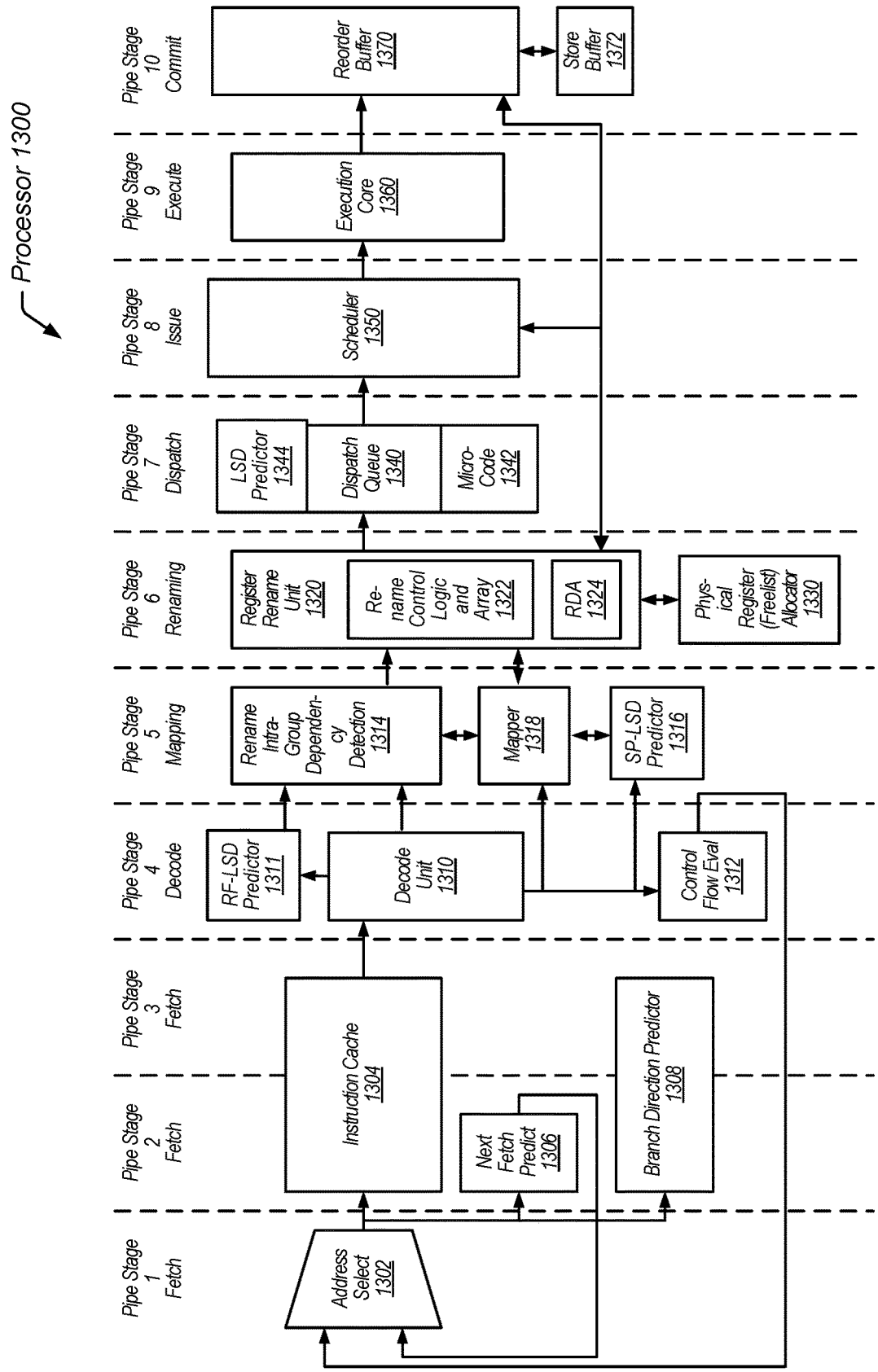
FIG. 13 is a block diagram of one embodiment of a processor.

Referring now to FIG. 13, a generalized block diagram illustrating one embodiment of a processor core 1300 that performs superscalar, out-of-order execution with zero cycle load operations is shown. The processor core 1300 may utilize a multi-stage pipeline for processing of instructions. Although functional and control blocks are shown in a particular order and in a particular pipe stage, other combinations are possible and contemplated. In addition, the functional and control blocks may occupy more than one pipe stage. In most cases, a single pipe stage is shown for each functional block for ease of illustration.

An instruction cache 1304 may store instructions for a software application. One or more instructions indicated by an address conveyed by address select logic 1302 may be fetched from the instruction cache 1304. Multiple instructions may be fetched from the instruction cache 1304 per clock cycle if there are no instruction cache misses. The address may be incremented by a next fetch predictor 1306. A branch direction predictor 1308 may be coupled to each of the next fetch predictor 1306 and the control flow evaluation logic 1312 in a later pipeline stage. The predictor 1308 may predict information of instructions that change the flow of an instruction stream from executing a next sequential instruction.

The decode unit 1310 decodes the opcodes of the multiple fetched instructions. Alternatively, the instructions may be divided into micro-ops. As used herein, the terms "instructions", "micro-ops", and "operations" are interchangeable as the invention may be used with an architecture that utilizes either implementation. In one embodiment, the control flow evaluation block 1312 may alter fetch of instructions in the address selector 1302. For example, an absolute address value associated with an unconditional branch opcode may be sent to the address selector 1302. In various embodiments, the register file load-store dependency (RF-LSD) predictor 1311 includes the functionality of RF-LSD predictor table 520 and control logic 530 (of FIG. 5).

Rename intra-group dependency detection logic 1314 may find dependencies among instructions decoded by the decode unit 1310. An intra-group of instructions may include decoded instructions from one or more clock cycles, or pipeline stages. Dependencies such as write-after-read (WAR), write-after-write (WAW) and read-after-write (RAW) may be detected. Dependency vectors that indicate dependencies between instructions may be generated.

In various embodiments, the stack pointer load-store dependency (SP-LSD) predictor 1316 includes the functionality of SP-LSD predictor table 220 and control logic 240 (of FIG. 2). The mapper 1318 may divide instructions among distributed hardware resources using factors such as available concurrency, criticality of dependence chains, and communication penalties. When the hardware renames an architectural register identifier with a physical register identifier, the hardware stores the mapping in the mapper 1318, which may be a data structure, such as a mapping table. As used herein, an identifier for either an architectural register or a physical register may also be referred to as a number. Therefore, an architectural register identifier may also be referred to as an architectural register number. Similarly, a physical register identifier may be referred to as a physical register number. The physical register number used to rename an architectural register number may also be referred to as a rename register number.

The register rename unit 1320 may include rename control logic and array 1322 and a register duplication array (RDA) 1324. The register rename unit 1320 may determine which physical register identifiers to use to rename architectural register identifiers used in both destination and source operands within instructions. The register rename unit may select candidate physical register identifiers from the free list allocator 1330 or a rename mapping table within the rename control logic 1322. In various embodiments, the RDA 1324 is configured to store an indication of duplicate mappings. The duplicate mappings may be used during conversion of a load operation to a zero cycle load operation.

The register rename unit 1320 may receive an indication from the RF-LSD predictor 1311 or the SP-LSD predictor 1316 that a load instruction qualifies to be converted to a zero cycle load operation. For example, a hit on a table entry of a table within the RF-LSD predictor 1311 or the SP-LSD predictor 1316 during a search may qualify the load instruction as a zero cycle load operation when the hit table entry is associated with an older (in program order) store instruction. The register rename unit 1320 may assign the destination operand register ID of the load instruction to a same rename register ID, which is also referred to as a physical register ID, as used for the source operand register ID of a producer-dependence store instruction or a producer-dependence load instruction that the consumer-dependence load operation is dependent upon. The mapper 1318 may store the multiple mappings for the rename register ID (physical register ID). Additionally, the RDA 1324 may store a duplicate count for the rename register ID (physical register ID).

In various embodiments, the duplicate count may not be incremented for a mapping when a particular architectural register is already mapped to the rename register number at the time of the mapping. The RDA 1324 may store both the rename register number and the associated duplicate count. In one embodiment, the RDA may be implemented as a relatively small, tagged, fully-associative structure. The RDA 1324 may have any number of entries for storing a rename register number and an associated duplicate count. In one example, an implementation of an ISA may include 144 physical register numbers, and thus, an 8-bit physical register index may be both stored in an entry of the RDA and used to access the RDA. In one embodiment, each duplicate count size is 5 bits. Therefore, a maximum number of duplications for a given physical register number is 31. However, another duplicate count size may be possible and chosen.

The RDA 1324 may be updated before or at the time of instruction dispatch in the processor pipeline. When either of the RF-LSD predictor 1311 or the SP-LSD predictor 1316 determines a decoded load instruction is a zero cycle load operation, the RDA 1324 may be accessed to determine whether an entry already exists for the physical register number to be used to rename each of the source operand register ID of an associated store instruction and the destination operand register ID of the load instruction. If an entry exists, then the associated duplicate count may be incremented each time any given architectural register ID currently not mapped to the given rename register number is mapped to the given rename register number. If an entry does not already exist in the RDA, then an entry may be allocated and the associated duplicate count may be initiated at two.

The RDA 1324 may also be updated during a commit pipeline stage in the processor pipeline. The duplicate count may be decremented each time the physical register identifier is ready to return to the free list for any given architectural register during an instruction commit. The physical register identifier may also be referred to as the rename register identifier. A physical register identifier may be a candidate to return to the free list in response to an entry in the mapping table associated with the physical register identifier is removed or invalidated due to the instruction commit. In one embodiment, in response to the duplicate count decreasing to one, the duplicate count and the duplicate mappings may no longer be stored.

In one embodiment, in response to a given rename register identifier is a candidate to return to the free list during an associated instruction commit, and no associated duplicate information is stored in the RDA 1324, the rename register identifier is returned to the free list. In another embodiment, in response to a given rename register identifier is a candidate to return to the free list and the stored duplicate count in the RDA 1324 is decremented by one to zero, the rename register identifier is returned to the free list.

In one embodiment, in response to a given rename register identifier is a candidate to return to the free list and the stored duplicate count is still greater than one after being decremented, the rename register identifier is not returned to the free list. The rename register identifier still has duplicate mappings to multiple architectural registers in this last case. In one embodiment, the RDA 1324 is checked for each potential zero cycle load candidate to make sure there is an entry free for tracking a duplicate. If there is not an entry free for allocation within the RDA 1324, then a corresponding load instruction is not converted to a zero cycle load operation. Similarly, if an allocated entry exists for the zero cycle load candidate, but the duplicate count is already saturated, then the load instruction is not converted to a zero cycle load operation.

For a zero cycle load operation, the data contents may be forwarded from a physical register within the physical register file that stores data for the store instruction source operand to the subsequent load instruction and to other younger, dependent instructions. The data may not be read from a data cache, a store buffer, or off-chip memory. The younger, dependent instructions may issue without waiting for data being read from the data cache, the store buffer, or off-chip memory.

In some embodiments, processor 1300 also includes the load-store dependency (LSD) predictor 1344 for predicting load-to-store memory dependencies. In various embodiments, the program counter (PC) of the load instruction is used for searching a table included in the LSD predictor. In some embodiments, the prediction from the RF-LSD predictor 1311 has the highest priority with the prediction from the SP-LSD predictor 1316 having the next highest priority and the prediction from the LSD predictor 1344 having the lowest priority. As shown, in an embodiment, RF-LSD predictor 1311 is accessed in the decode pipeline stage and SP-LSD predictor 1316 is accessed in the mapping pipeline stage. In other embodiments, each of RF-LSD predictor 1311 and SP-LSD predictor 1316 is accessed in a same pipeline stage. In an embodiment, the same pipeline stage is the mapping pipeline stage. After instructions have been decoded and renamed, associated entries may be allocated in the dispatch queue 1340. Instructions and associated renamed identifiers, program counter (PC) values, dependency vectors, markings for completion, and so forth may be sent to the dispatch queue 1340 and later to the scheduler 1350. Various exceptions may be detected, such as by the execution core 1360. Examples include protection exceptions for memory accesses, no address translation, and so forth. The exceptions may cause a corresponding exception handling routine to be executed, such as by the microcode 1342.

The scheduler 1350 may schedule instructions for execution in the execution core 1360. When operands are available and hardware resources are also available, an instruction may be issued out-of-order from the scheduler 1350 to one of the functional units within the execution core 1360. The scheduler 1350 may read its source operands from the physical register file (not shown) after translating renamed identifiers with a mapping table or from operand bypass logic. The source operands may be provided to the execution core 1360. The execution core 1360 may resolve addresses for load and store instructions. In addition, the execution core 1360 may perform one or more of multiple integer, floating-point, and Boolean operations.

The execution core 1360 may include a load/store unit. The load/store unit may be connected to a data cache (not shown) and the store buffer 1372 either directly or through the reorder buffer (rob) 1370. The processor 1300 may include a translation look-aside buffer (TLB) for each of the instruction cache 1304 and the data cache to avoid a cost of performing a full memory translation when performing a cache access. The store buffer 1372 may store addresses corresponding to store instructions. The rob 1370 may receive results from the execution core 1360. In addition, results may be bypassed to previous pipeline stages for data forwarding to dependent instructions already in the pipeline. The rob 1370 may ensure in-order commit and retirement of instructions.

Figure 14:
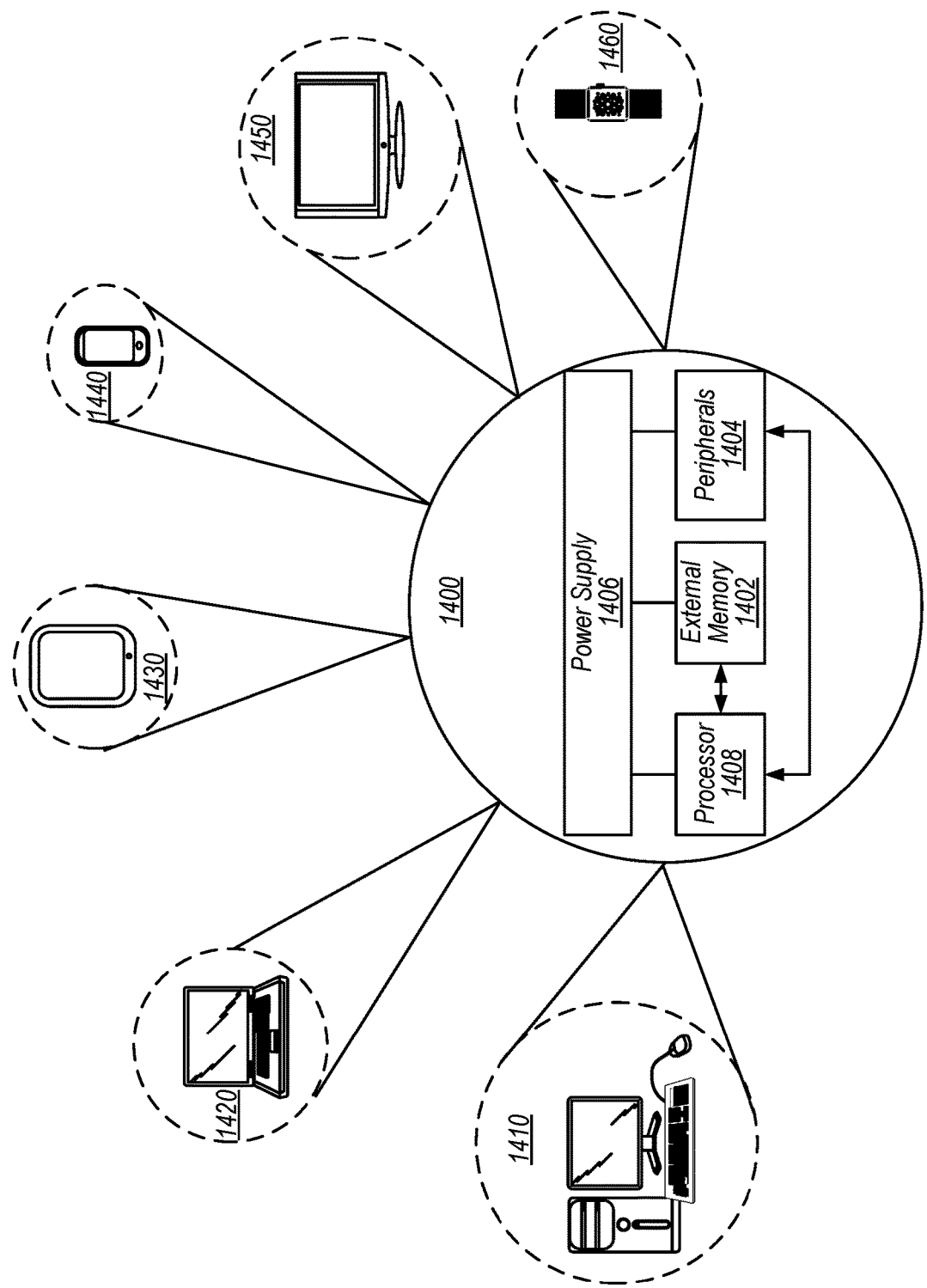
FIG. 14 is a block diagram of one embodiment of a computing system.

Turning next to FIG. 14, a block diagram of one embodiment of a system 1400 is shown. As shown, system 1400 may represent chip, circuitry, components, etc., of a desktop computer 1410, laptop computer 1420, tablet computer 1430, cell or mobile phone 1440, television 1450 (or set top box configured to be coupled to a television), wrist watch or other wearable item 1460, or otherwise. Other devices are possible and are contemplated. In the illustrated embodiment, the system 1400 includes at least one instance of processor 1408 which includes one or more load-store dependency (LSD) predictors. For example, in some embodiments, processor 1408 includes one or more of a register file (RF) LSD predictor and a stack pointer (SP) LSD predictor. Processor 1408 is coupled to an external memory 1402. In various embodiments, processor 1408 may be included within a system on chip (SoC) or integrated circuit (IC) which is coupled to external memory 1402, peripherals 1404, and power supply 1406.

Processor 1408 is coupled to one or more peripherals 1404 and the external memory 1402. A power supply 1406 is also provided which supplies the supply voltages to processor 1408 as well as one or more supply voltages to the memory 1402 and/or the peripherals 1404. In various embodiments, power supply 1406 may represent a battery (e.g., a rechargeable battery in a smart phone, laptop or tablet computer). In some embodiments, more than one instance of processor 1408 may be included (and more than one external memory 1402 may be included as well).

The memory 1402 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with a SoC or an IC containing processor 100 in a chip-on-chip configuration, a package-on-package configuration, or a multi-chip module configuration.

The peripherals 1404 may include any desired circuitry, depending on the type of system 1400. For example, in one embodiment, peripherals 1404 may include devices for various types of wireless communication, such as Wi-Fi, Bluetooth, cellular, global positioning system, etc. The peripherals 1404 may also include additional storage, including RAM storage, solid state storage, or disk storage. The peripherals 1404 may include user interface devices such as a display screen, including touch display screens or multitouch display screens, keyboard or other input devices, microphones, speakers, etc.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computer during use to provide the program instructions and accompanying data to the computer for program execution. In some embodiments, a synthesis tool reads the program instructions in order to produce a netlist comprising a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A processor comprising:
a decode unit configured to decode one or more fetched instructions;
a first load-store dependence (LSD) predictor configured to:
receive decoded instructions;
predict a first memory dependence of a first load instruction on a first store instruction, wherein to predict the first memory dependence, the first LSD predictor is configured to determine a source register of the first store instruction matches a destination register of the first load instruction, wherein the first load instruction is determined to be a pop instruction and the first store instruction is determined to be a push instruction; and
in response to predicting the first memory dependence, assign a physical register identifier (ID) associated with the source register of the first store instruction to the destination register of the first load instruction.

2. The processor as recited in claim 1, wherein the processor further comprises a second LSD predictor configured to predict, after the first LSD predictor predicts the first memory dependence, a second memory dependence of a second load instruction on a second store instruction based at least in part on a program counter value of the second load instruction.

3. The processor as recited in claim 2, wherein the first memory dependence has higher priority than the second memory dependence.

4. The processor as recited in claim 1, wherein the processor further comprises a third LSD predictor configured to:
predict a third memory dependence of a third load instruction on a third store instruction based at least in part on determining an address architectural register ID of the third store instruction matches an address architectural register ID of the third load instruction, wherein neither of the third store instruction and the third load instruction comprises a stack pop operation; and
in response to predicting the third memory dependence of the third load instruction, assign a physical register ID associated with a source architectural register ID of the third store instruction to a destination architectural register ID of the third load instruction.

5. The processor as recited in claim 4, wherein the third LSD predictor is further configured to predict the third memory dependence before the first LSD predictor predicts the first memory dependence.

6. The processor as recited in claim 4, wherein the third LSD predictor is configured to determine a fourth memory dependence on a fourth load instruction by a fifth load instruction based on determining address operands of the fourth load instruction match address operands of the fifth load instruction.

7. The processor as recited in claim 4, wherein the third LSD predictor is configured to assign a physical register ID associated with a source architectural register ID of a fifth store instruction to a destination architectural register ID of a sixth load instruction, in response to:
determining an aliasing instruction is between a fourth store instruction and the fifth store instruction in program order; and
determining at least an address architectural register ID of the fourth store instruction matches an address architectural register ID of the sixth load instruction.

8. The processor as recited in claim 7, wherein the aliasing instruction is a register-to-register move instruction comprising:
a source architectural register ID matching the address architectural register ID of the fourth store instruction; and
a destination architectural register ID matching the address architectural register ID of the fifth store instruction.

9. The processor as recited in claim 4, wherein the third LSD predictor is configured to determine no memory dependence on a sixth store instruction by a seventh load instruction with an address architectural register ID matching an address architectural register ID of the sixth store instruction, in response to:

determining at least an address architectural register ID of the sixth store instruction matches an address architectural register ID of the seventh load instruction;

determining an immediate value of the sixth store instruction does not match an immediate value of the seventh load instruction.

10. A method, comprising:

receiving, by a first load-store dependence (LSD) predictor, decoded instructions;

predicting, by the first LSD predictor, a first memory dependence of a first load instruction on a first store instruction, wherein predicting the first memory dependence comprises determining a source register of the first store instruction matches a destination register of the first load instruction, wherein the first load instruction is determined to be a pop instruction and the first store instruction is determined to be a push instruction; and in response to predicting the first memory dependence, assigning, by the first LSD predictor, a physical register identifier (ID) associated with the source register of the first store instruction to the destination register of the first load instruction.

11. The method as recited in claim 10, further comprising predicting, by a second LSD predictor after the first LSD predictor predicts the first memory dependence, a second memory dependence of a second load instruction on a second store instruction based at least in part on a program counter value of the second load instruction.

12. The method as recited in claim 11, wherein the first memory dependence has higher priority than the second memory dependence.

13. The method as recited in claim 10, further comprising:

determining, by a third LSD predictor, a third memory dependence of a third load instruction on a third store instruction based at least in part on determining an address architectural register ID of the third store instruction matches an address architectural register ID of the third load instruction, wherein neither of the third store instruction and the third load instruction comprises a stack pop operation; and in response to predicting the third memory dependence of the third load instruction, assigning, by the third LSD predictor, a physical register ID associated with a source architectural register ID of the third store instruction to a destination architectural register ID of the third load instruction.

14. The method as recited in claim 13, further comprising predicting, by the third LSD predictor, a fourth memory dependence on a fourth load instruction by a fifth load instruction based on determining address operands of the fourth load instruction match address operands of the fifth load instruction.

15. A computing system comprising:

a memory configured to store data; and a processor; and wherein the processor is configured to:

fetch instructions from the memory;

send memory access requests to the memory;

decode fetched instructions;

predict a first memory dependence of a first load instruction on a first store instruction, wherein to predict the first memory dependence, the processor is configured to determine a source register of the first store instruction matches a destination register of the first load instruction, wherein the first load instruction is determined to be a pop instruction and the first store instruction is determined to be a push instruction; and in response to predicting the first memory dependence, assign a physical register identifier (ID) associated with the source register of the first store instruction to the destination register of the first load instruction.

16. The computing system as recited in claim 15, wherein the processor is further configured to predict, after predicting the first memory dependence, a second memory dependence of a second load instruction on a second store instruction based at least in part on a program counter value of the second load instruction.

17. The computing system as recited in claim 16, wherein the processor is further configured to:

predict a third memory dependence of a third load instruction on a third store instruction based at least in part on determining an address architectural register ID of the third store instruction matches an address architectural register ID of the third load instruction, wherein neither of the third store instruction and the third load instruction comprises a stack pop operation; and in response to predicting the third memory dependence of the third load instruction, assign a physical register ID associated with a source architectural register ID of the third store instruction to a destination architectural register ID of the third load instruction.

* * * * *